United States Patent
Peled et al.

(10) Patent No.: US 12,141,429 B2
(45) Date of Patent: Nov. 12, 2024

(54) PRELOADING OF APPLICATIONS AND IN-APPLICATION CONTENT IN USER DEVICES

(71) Applicant: TENSERA NETWORKS LTD., Hod Hasharon (IL)

(72) Inventors: Roee Peled, Ramat Gan (IL); Amit Wix, Raanana (IL); Ehud Weinstein, Tel Aviv (IL); David Ben Eli, Modiin (IL); Daniel Yellin, Raanana (IL); Eilon Regev, Givatayim (IL); Navot Goren, Kibbutz Ramot Menashe (IL); Shimon Moshavi, Beit Shemesh (IL)

(73) Assignee: Tensera Networks Ltd., Tel Aviv (IL)

( * ) Notice: Subject to any disclaimer, the term of this patent is extended or adjusted under 35 U.S.C. 154(b) by 8 days.

(21) Appl. No.: 17/797,130

(22) PCT Filed: Feb. 10, 2021

(86) PCT No.: PCT/IB2021/051055
§ 371 (c)(1),
(2) Date: Aug. 3, 2022

(87) PCT Pub. No.: WO2021/161174
PCT Pub. Date: Aug. 19, 2021

(65) Prior Publication Data
US 2023/0054174 A1 Feb. 23, 2023

Related U.S. Application Data

(60) Provisional application No. 63/128,220, filed on Dec. 21, 2020, provisional application No. 63/118,068, (Continued)

(51) Int. Cl.
*G06F 3/048* (2013.01)
*G06F 3/0481* (2022.01)
(Continued)

(52) U.S. Cl.
CPC .......... *G06F 3/0487* (2013.01); *G06F 3/0481* (2013.01); *G06F 9/485* (2013.01)

(58) Field of Classification Search
CPC ....... G06F 3/0487; G06F 3/0481; G06F 9/485
See application file for complete search history.

(56) References Cited

U.S. PATENT DOCUMENTS

| 6,038,596 A | 3/2000 | Baldwin et al. |
| 6,807,570 B1 | 10/2004 | Allen et al. |

(Continued)

FOREIGN PATENT DOCUMENTS

| CN | 102063302 A | 5/2011 |
| CN | 108681475 A | 10/2018 |

(Continued)

OTHER PUBLICATIONS

U.S. Appl. No. 17/567,183 Office Action dated Dec. 30, 2022.
(Continued)

*Primary Examiner* — David E Choi
(74) *Attorney, Agent, or Firm* — MEITAR PATENTS LTD.

(57) ABSTRACT

A method includes, in a user device (24) that runs an Operating System (OS-48), deciding to preload at least a User-Interface (UI) display of a user application (26). At least the UI display is preloaded in a simulated-foreground mode in which the UI display is (i) processed in a foreground mode by the user application, but (ii) kept in a background mode by the OS and hidden from a user of the user device.

32 Claims, 5 Drawing Sheets

Related U.S. Application Data filed on Nov. 25, 2020, provisional application No. 63/066,271, filed on Aug. 16, 2020, provisional application No. 62/986,807, filed on Mar. 9, 2020, provisional application No. 62/975,789, filed on Feb. 13, 2020.

(51) Int. Cl.
  *G06F 3/0487* (2013.01)
  *G06F 9/48* (2006.01)

(56) References Cited

U.S. PATENT DOCUMENTS

| | | |
|---|---|---|
| 7,703,133 B1 | 4/2010 | Balasubramanian et al. |
| 8,140,997 B2 | 3/2012 | Nemoto |
| 8,250,228 B1 | 8/2012 | Johansson |
| 8,341,245 B1 | 12/2012 | Roskind et al. |
| 8,418,190 B2 | 4/2013 | Rivard et al. |
| 8,881,033 B2 | 11/2014 | Mentchoukov et al. |
| 9,385,914 B1 | 7/2016 | Britto et al. |
| 9,513,888 B1 | 12/2016 | Fultz et al. |
| 9,565,233 B1 | 2/2017 | Ozuysal et al. |
| 9,959,506 B1 | 5/2018 | Karppanen |
| 9,961,159 B2 | 5/2018 | Yellin et al. |
| 9,979,796 B1 | 5/2018 | Yellin et al. |
| 10,013,497 B1 | 7/2018 | Boodman |
| 10,432,748 B2 | 10/2019 | Yellin et al. |
| 10,459,887 B1 | 10/2019 | Dvortsov et al. |
| 10,613,735 B1 | 4/2020 | Karpe et al. |
| 11,095,743 B2 | 8/2021 | Yellin et al. |
| 11,128,729 B2 | 9/2021 | Yellin et al. |
| 11,715,084 B1 | 8/2023 | Dixon et al. |
| 2003/0101234 A1 | 5/2003 | McBrearty et al. |
| 2003/0195940 A1 | 10/2003 | Basu et al. |
| 2003/0220984 A1 | 11/2003 | Jones et al. |
| 2004/0030882 A1 | 2/2004 | Forman |
| 2005/0066283 A1 | 3/2005 | Kanamaru |
| 2005/0132302 A1 | 6/2005 | Cina |
| 2006/0026636 A1 | 2/2006 | Stark et al. |
| 2006/0101514 A1 | 5/2006 | Milener et al. |
| 2006/0111920 A1* | 5/2006 | Jacobs .............. G06Q 10/00 705/902 |
| 2008/0307339 A1 | 12/2008 | Boro et al. |
| 2009/0006671 A1 | 1/2009 | Batson et al. |
| 2009/0037393 A1 | 2/2009 | Fredricksen et al. |
| 2010/0058248 A1 | 3/2010 | Park |
| 2011/0211813 A1 | 9/2011 | Marks |
| 2011/0249668 A1 | 10/2011 | Van Milligan et al. |
| 2012/0023226 A1 | 1/2012 | Petersen et al. |
| 2012/0023506 A1 | 1/2012 | Maeckel et al. |
| 2012/0084343 A1 | 4/2012 | Mir et al. |
| 2012/0137296 A1 | 5/2012 | Chen et al. |
| 2012/0159393 A1* | 6/2012 | Sethi .............. G06F 16/248 715/830 |
| 2012/0167122 A1 | 6/2012 | Koskimies |
| 2012/0278432 A1 | 11/2012 | Luna |
| 2012/0317188 A1 | 12/2012 | Fredricksen et al. |
| 2012/0324481 A1 | 12/2012 | Xia et al. |
| 2013/0019159 A1 | 1/2013 | Civelli et al. |
| 2013/0031204 A1 | 1/2013 | Graham et al. |
| 2013/0106914 A1 | 5/2013 | Jain et al. |
| 2013/0120294 A1* | 5/2013 | Sun .............. G06F 3/041 345/173 |
| 2013/0173513 A1 | 7/2013 | Chu et al. |
| 2013/0185633 A1 | 7/2013 | Bunker et al. |
| 2013/0238751 A1* | 9/2013 | Raleigh .............. H04L 67/562 709/217 |
| 2013/0263023 A1 | 10/2013 | Goodwin et al. |
| 2013/0275899 A1 | 10/2013 | Schubert et al. |
| 2013/0283283 A1 | 10/2013 | Wang et al. |
| 2014/0047003 A1 | 2/2014 | Golden et al. |
| 2014/0053057 A1 | 2/2014 | Reshadi et al. |
| 2014/0094163 A1 | 4/2014 | Widdowson et al. |
| 2014/0162793 A1 | 6/2014 | Quan et al. |
| 2014/0188932 A1* | 7/2014 | Kalita .............. G09B 19/0053 707/770 |
| 2014/0201673 A1 | 7/2014 | Dunn |
| 2014/0280485 A1 | 9/2014 | A Hummaida et al. |
| 2014/0359442 A1 | 12/2014 | Lin |
| 2014/0372356 A1 | 12/2014 | Bilal et al. |
| 2014/0373032 A1 | 12/2014 | Merry et al. |
| 2015/0026415 A1 | 1/2015 | Clausen et al. |
| 2015/0045921 A1 | 2/2015 | Stewart et al. |
| 2015/0046519 A1 | 2/2015 | Shukla et al. |
| 2015/0127819 A1* | 5/2015 | Cimino .............. H04L 43/16 709/224 |
| 2015/0193395 A1 | 7/2015 | Nicolaou et al. |
| 2015/0207852 A1 | 7/2015 | Boodman et al. |
| 2015/0208205 A1 | 7/2015 | Chan et al. |
| 2015/0215816 A1 | 7/2015 | Abou-Elkheir et al. |
| 2015/0281147 A1 | 10/2015 | Wang et al. |
| 2015/0347615 A1 | 12/2015 | McGushion et al. |
| 2015/0371142 A1 | 12/2015 | Jain |
| 2015/0372933 A1 | 12/2015 | Cai et al. |
| 2016/0012104 A1* | 1/2016 | Petrov .............. G06F 16/951 707/706 |
| 2016/0057167 A1 | 2/2016 | Bach |
| 2016/0085583 A1 | 3/2016 | Goodson |
| 2016/0103608 A1 | 4/2016 | Nukala et al. |
| 2016/0227464 A1 | 8/2016 | Senarath et al. |
| 2016/0259623 A1 | 9/2016 | Sumner et al. |
| 2016/0259656 A1 | 9/2016 | Sumner et al. |
| 2016/0344679 A1 | 11/2016 | Lane et al. |
| 2017/0011681 A1 | 1/2017 | Bathiche et al. |
| 2017/0031869 A1 | 2/2017 | Franczyk et al. |
| 2017/0032568 A1* | 2/2017 | Gharpure .............. G06T 13/20 |
| 2017/0046235 A1 | 2/2017 | Straub et al. |
| 2017/0126833 A1 | 5/2017 | DeLuca et al. |
| 2017/0278477 A1 | 9/2017 | Jeong et al. |
| 2017/0293465 A1 | 10/2017 | Kotteri et al. |
| 2017/0371685 A1 | 12/2017 | Tanaka et al. |
| 2018/0129537 A1 | 5/2018 | Kurtzman et al. |
| 2018/0212741 A1 | 7/2018 | Lindoff et al. |
| 2018/0241837 A1 | 8/2018 | Yellin et al. |
| 2018/0246862 A1 | 8/2018 | Burkard et al. |
| 2018/0293087 A1 | 10/2018 | Lee et al. |
| 2018/0364890 A1 | 12/2018 | Lee et al. |
| 2019/0065144 A1 | 2/2019 | Sumner et al. |
| 2019/0087205 A1 | 3/2019 | Guday |
| 2019/0100152 A1* | 4/2019 | Shastry .............. H04N 21/2146 |
| 2019/0188005 A1 | 6/2019 | Chen et al. |
| 2019/0188012 A1 | 6/2019 | Chen et al. |
| 2019/0188013 A1 | 6/2019 | Krishna et al. |
| 2019/0196849 A1 | 6/2019 | Chen et al. |
| 2019/0205159 A1 | 7/2019 | Wen et al. |
| 2019/0221224 A1 | 7/2019 | Heitkamp et al. |
| 2019/0347128 A1 | 11/2019 | Han et al. |
| 2019/0361581 A1 | 11/2019 | Wang et al. |
| 2019/0370022 A1* | 12/2019 | Han .............. G06F 9/445 |
| 2019/0370095 A1 | 12/2019 | Chen et al. |
| 2020/0159597 A1 | 5/2020 | Yellin et al. |
| 2020/0159816 A1 | 5/2020 | Bostrom et al. |
| 2020/0183822 A1 | 6/2020 | Bates |
| 2020/0225818 A1 | 7/2020 | Ozuysal |
| 2020/0336514 A1 | 10/2020 | Momchilov et al. |
| 2020/0342338 A1 | 10/2020 | Huang |
| 2020/0401418 A1 | 12/2020 | Regev et al. |
| 2021/0103447 A1 | 4/2021 | Wei et al. |
| 2021/0149689 A1 | 5/2021 | Jung et al. |
| 2021/0224085 A1 | 7/2021 | Moore |
| 2021/0304096 A1 | 9/2021 | Kirubakaran et al. |
| 2021/0323908 A1 | 10/2021 | Yellin et al. |
| 2021/0329088 A1 | 10/2021 | Yellin et al. |
| 2021/0329089 A1 | 10/2021 | Yellin et al. |
| 2021/0329090 A1 | 10/2021 | Yellin et al. |
| 2021/0329091 A1 | 10/2021 | Yellin et al. |
| 2021/0385295 A1 | 12/2021 | Yellin et al. |
| 2022/0121725 A1 | 4/2022 | Peled et al. |
| 2022/0124171 A1 | 4/2022 | Peled et al. |
| 2022/0179667 A1 | 6/2022 | Peled et al. |
| 2022/0179668 A1 | 6/2022 | Peled et al. |
| 2022/0210264 A1 | 6/2022 | Jung et al. |
| 2022/0221998 A1 | 7/2022 | Xu |

(56) References Cited

U.S. PATENT DOCUMENTS

| | | | |
|---|---|---|---|
| 2022/0261258 A1 | 8/2022 | Peled et al. | |
| 2022/0413695 A1 | 12/2022 | Guan et al. | |
| 2023/0018798 A1 | 1/2023 | Coffman et al. | |
| 2023/0054174 A1* | 2/2023 | Peled | G06F 3/0481 |
| 2023/0135295 A1 | 5/2023 | Cha et al. | |

FOREIGN PATENT DOCUMENTS

| | | |
|---|---|---|
| CN | 108920156 A | 11/2018 |
| CN | 108958828 A | 12/2018 |
| KR | 20160116910 A | 10/2016 |
| WO | 2015169188 A1 | 11/2015 |
| WO | 2018055506 A1 | 3/2018 |
| WO | 2018234967 A1 | 12/2018 |
| WO | 2021019415 A1 | 2/2021 |
| WO | 2019082042 A1 | 5/2021 |
| WO | 2022118131 A1 | 6/2022 |
| WO | 2022130156 A1 | 6/2022 |
| WO | 2022162515 A1 | 8/2022 |

OTHER PUBLICATIONS

U.S. Appl. No. 17/739,122 Office Action dated Feb. 1, 2023.
EP Application # 20845959.4 Search Report dated Feb. 2, 2023.
U.S. Appl. No. 17/624,357 Office Action dated Mar. 13, 2023.
U.S. Appl. No. 17/567, 187 Office Action dated Mar. 27, 2023.
"Understand the Activity Lifecycle," Android Developers, pp. 1-21, last updated Oct. 27, 2021, as downloaded from https://developer.android.com/guide/components/activities/activity-lifecycle.
International Application # PCT/IB2021/051055 Search Report dated May 20, 2021.
Wix et al., U.S. Appl. No. 17/849,644, filed Jun. 26, 2022.
Wix et al., U.S. Appl. No. 17/849,646, filed Jun. 26, 2022.
U.S. Appl. No. 17/363,047 Office Action dated Nov. 1, 2022.
U.S. Appl. No. 16/968,652 Office Action dated Jul. 10, 2023.
U.S. Appl. No. 17/849,644 Office Action dated Oct. 5, 2023.
Lee et al., "CAS: Context-Aware Background Application Scheduling in Interactive Mobile Systems," IEEE Journal on Selected Areas in Communications, vol. 35, No. 5, pp. 1013-1029, May 2017.
CN Application # 2021800134875 Office Action dated Dec. 12, 2023.
U.S. Appl. No. 17/582,025 Office Action dated Nov. 6, 2023.
EP Application # 21754503.7 Search Report dated Jan. 29, 2024.
U.S. Appl. No. 17/849,646 Office Action dated Jan. 30, 2024.
U.S. Appl. No. 17/681,883 Office Action dated Feb. 8, 2024.
CN Application # 202180013487.5 Office Action dated Jun. 12, 2024.

* cited by examiner

PRELOADING OF APPLICATIONS AND IN-APPLICATION CONTENT IN USER DEVICES

CROSS-REFERENCE TO RELATED APPLICATIONS

This application is U.S. National Phase of PCT Application PCT/IB2021/051055, filed Feb. 10, 2021, which claims the benefit of U. S. Provisional Patent Application 62/975,789, filed Feb. 13, 2020, U.S. Provisional Patent Application 62/986,807, filed Mar. 9, 2020, U.S. Provisional Patent Application 63/066,271, filed Aug. 16, 2020, U. S. Provisional Patent Application 63/118,068, filed Nov. 25, 2020, and U.S. Provisional Patent Application 63/128,220, filed Dec. 21, 2020. The disclosures of all these related applications are incorporated herein by reference.

FIELD OF THE INVENTION

The present invention relates generally to communication systems, and particularly to methods and systems for preloading of applications and content in user devices.

BACKGROUND OF THE INVENTION

In applications ("apps") that run on user devices such as smartphones, one of the major factors affecting user experience is the latency of the User Interface (UI). Various techniques have been proposed for reducing latency and providing a more responsive UI. Some techniques involve prefetching of content. Other techniques involve background preloading of apps. Yet other techniques involve pre-rendering of an app's UI. Techniques of this sort are described, for example, in PCT International Publication WO 2018/055506, entitled "An Optimized CDN for the Wireless Last Mile," which is incorporated herein by reference.

PCT International Publication WO 2019/171237, entitled "Application Preloading in the Presence of User Actions," whose disclosure is incorporated herein by reference, describes a method in a processor of a user device. The method includes preloading one or more user applications in a background mode. An activity, which is invoked in the processor and is associated with a given preloaded user application, is detected. An assessment is made by the processor, whether the activity is a preload-initiated activity that is invoked due to preloading of the given user application, or whether the activity is a user-initiated activity that is invoked due to an action by the user. If the activity is assessed to be a preload-initiated activity, the activity is handled using a first handling scheme. If the activity is assessed to be a user-initiated activity, the activity is handled using a second handling scheme, different from the first handling scheme.

SUMMARY OF THE INVENTION

An embodiment of the present invention that is described herein provides a method including, in a user device that runs an Operating System (OS), deciding to preload at least a User-Interface (UI) display of a user application. At least the UI display is preloaded in a simulated-foreground mode in which the UI display is (i) processed in a foreground mode by the user application, but (ii) kept in a background mode by the OS and hidden from a user of the user device.

In some embodiments, the method further includes maintaining by the OS (i) one or more first data structures for storing non-preloaded UI displays and (ii) one or more second data structures for storing preloaded UI displays, and preloading the UI display includes initially assigning the UI display to one of the second data structures, and subsequently, in response to meeting a criterion, reassigning the UI display to one of the first data structures.

In an embodiment, reassigning the UI display to one of the first data structures is performed upon deciding that preloading of the UI display is completed successfully, or upon user interaction with the user application. In an example embodiment, the one or more first data structures include one or more first stacks of non-preloaded UI displays, and the one or more second data structures include one or more second stacks of preloaded UI displays. In another embodiment, the one or more first data structures include a target display associated with non-preloaded UI displays, and the one or more second data structures include one or more virtual displays associated with preloaded UI displays.

In a disclosed embodiment, preloading the UI display includes applying lifecycle events of the OS that are specified for foreground processing of activities.

In some embodiments, the method includes deciding that preloading of the UI display is completed successfully in accordance with a completion criterion, and in response transitioning the UI display to a preloaded-background state in which both the OS and the user application consider the UI display to be in the background. Deciding that preloading is completed successfully may include detecting expiry of a maximum time duration set for the simulated-foreground mode. Additionally or alternatively, deciding that preloading is completed successfully may include receiving from the user application a notification that the preloading is completed successfully.

In another embodiment, the method includes discarding the preloaded UI display in response to detecting an error occurring in the simulated-foreground mode. In yet another embodiment, preloading at least the UI display includes preventing the preloading from affecting one or more of (i) a recents list of the user device, (ii) usage metrics of the user device, and (iii) decisions relating to entry to a power-saving state.

In an embodiment, preloading at least the UI display includes notifying the user application, via an Application Programming Interface (API), that the at least the UI display is being preloaded. Additionally or alternatively, preloading at least the UI display may include notifying the user application, via an Application Programming Interface (API), of a detected user interaction with the preloaded user application.

In some embodiments, preloading at least the UI display includes preloading at least part of the user application starting from an entry-point UI display of the user application. In an example embodiment, preloading the user application includes preloading the entry-point UI display, and one or more additional UI displays, in accordance with a start-up sequence of the user application. In another embodiment, preloading the user application includes preloading a given UI display only upon verifying that invocation of the given UI display is preload-initiated and not user-initiated.

In another embodiment, preloading the user application includes deciding that preloading of the user application is completed successfully, by detecting expiry of a maximum defined time duration. In yet another embodiment, preloading the user application includes deciding that preloading of the user application is completed successfully, by receiving from the user application a notification that the preloading is completed successfully. In still another embodiment, preloading the user application excludes preloading of one or more of (i) content that changes by more than a predefined rate, and (ii) content whose preloading required fetching over a network.

In some embodiments, preloading at least the UI display includes preloading one or more in-app UI displays, which are associated with the user application but are not immediately displayed upon launch of the user application. In an embodiment, preloading the in-app UI displays is performed while the user application is running in a foreground mode. In another embodiment, preloading the in-app UI displays is performed while the user application is running in a background mode.

In some embodiments, preloading the in-app UI displays includes caching the preloaded in-app UI displays in a memory of the user device, and serving the preloaded in-app UI displays from the memory in response to a request from the user application. In a disclosed embodiment, caching the in-app UI displays includes assigning each in-app UI display a respective expiry time, and serving the in-app UI display from the memory only in response to verifying that the expiry time has not expired.

In some embodiments, the method includes maintaining a preloading policy, which governs preloading of UI displays. Maintaining the preloading policy may include running, in the user device, a system app that maintains the preloading policy. In an embodiment, maintaining the preloading policy includes setting the preloading policy by communication between the system app and a network-side server.

In some embodiments, preloading at least the UI display includes preloading the UI display with a target orientation that differs from a current display orientation of the user device. In an example embodiment, the target orientation is an orientation with which the user is predicted to access the user application.

In an embodiment, preloading at least the UI display includes fetching content of the UI display over a network, with a quality that is higher than the quality used for real-time fetching of the content. In another embodiment, deciding to preload at least the UI display includes receiving from the user an explicit request to preload the user application. In another embodiment, the method includes presenting to the user information indicative of a progress of preloading the at least UI display.

There is additionally provided, in accordance with an embodiment of the present invention, a user device including a display screen and a processor. The display screen is configured to display User-Interface (UI) displays of user applications to a user. The processor is configured to run an Operating System (OS) of the user device, to decide to preload at least a UI display of a user application, and to preload at least the UI display in a simulated-foreground mode in which the UI display is (i) processed in a foreground mode by the user application, but (ii) kept in a background mode by the OS and hidden from a user of the user device.

The present invention will be more fully understood from the following detailed description of the embodiments thereof, taken together with the drawings in which:

DETAILED DESCRIPTION OF EMBODIMENTS

Definitions

Figure 1:
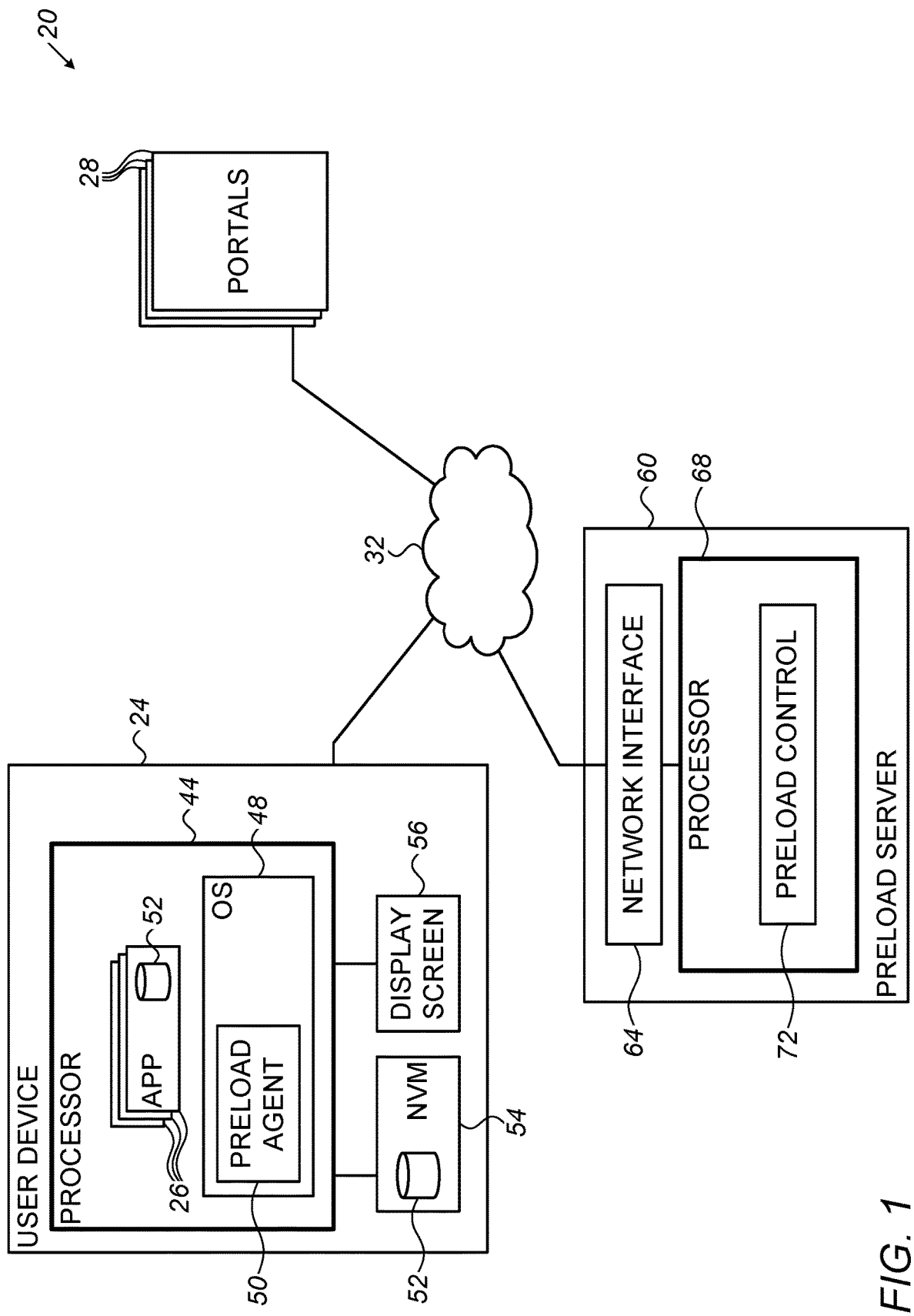
FIG. 1 is a block diagram that schematically illustrates a communication system that employs preloading, in accordance with an embodiment of the present invention.

The present disclosure makes reference to operations and processes such as preloading and pre-rendering of applications ("apps") and app components such as User Interface (UI) Displays.

In the present context, the term "preloading" refers to the process of loading, launching and at least partially running an app in a background mode unnoticeably to the user, not in response to (and typically before) invocation of the app by the user. App components that may be preloaded comprise, for example, the main feed of the app, other UI displays of the app, and/or in-app content, i.e., app content that is not immediately visible to the user upon launching the app. The term "UI display" in this context refers to a logical UI element—A view or a window that is used by the app to enable interaction with the user. In the Android Operating System (OS), for example, UI displays are referred to as Views or Activities.

The term "pre-rendering" refers to the process of constructing a UI display of an app in the background mode. Pre-rendering is considered herein to be a component of a preloading operation. Pre-rendering may involve UI tasks that modify the UI display, and/or UI tasks that do not directly modify the UI display but are prerequisite to such modification or are synced to modification of the UI display in the background. Thus, for example, initialization or preparatory tasks that are performed when preloading an app and preparing to initialize or modify a UI display of the app are also regarded herein as pre-rendering tasks.

Overview

Embodiments of the present invention that are described herein provide improved methods and systems for preloading of user applications ("apps") and their content in user devices. The disclosed preloading schemes reduce the latency perceived by users when interacting with apps, and therefore provide an enhanced user experience.

In some embodiments, a user device runs an Operating System (OS) that, among other functions, preloads UI displays of user apps. The disclosed techniques can be used for preloading of individual UI displays, of groups of interrelated UI displays, or of entire apps. For the sake of clarity, the description that follows refers mainly to the Android OS and to Android Activities, by way of example. The disclosed techniques, however, are applicable to any other suitable OS and any other suitable type of UI display.

In some disclosed embodiments, the OS preloads an Activity using a novel operational mode that is referred to herein as "foreground simulation" or "simulated foreground". In this mode, the app processes the Activity in a foreground mode, but the OS keeps the Activity in a background mode that is hidden from the user. In other words, an Activity undergoing foreground simulation is in the foreground from the perspective of the app, and in the background from the perspective of the OS. In some embodiments, the app is unaware of the fact that the Activity is being preloaded in the background and not loaded conventionally in the foreground. In other embodiments, the OS notifies the app that the Activity is being preloaded in the background, enabling the app to use different program code intended for foreground simulation.

The disclosed foreground simulation mode enables Activities to be preloaded, including pre-rendering and other suitable preloading-related operations, optionally using the existing app program code, while nevertheless keeping the Activities in the background, unnoticeable to the user.

Various aspects of foreground simulation, including implementation examples of preloading Activities, apps and in-app content, criteria for terminating foreground simulation, as well as implementation using existing foreground lifecycle states/events of the OS, are described herein. In some embodiments the disclosed techniques are implemented using Application Programming Interfaces (APIs) that are provided to user apps by the OS.

In some embodiments, the OS keeps preloading operations transparent to the user by isolating preloaded Activities from non-preloaded Activities. In particular, the OS may store preloaded Activities and non-preloaded Activities in separate data structures, e.g., separate Tasks, Task stacks and/or Displays. When a preloaded Activity needs to be displayed to the user, the OS typically moves the activity from the data structures dedicated to preloaded Activities to the data structures dedicated to non-preloaded Activities.

Other disclosed embodiments relate to triggering of preloading by explicit user request, and to providing the user information indicative of the progress of preloading.

System Description

FIG. 1 is a block diagram that schematically illustrates a communication system 20 that employs preloading, in accordance with an embodiment of the present invention.

System 20 comprises a user device 24, which runs one or more user applications ("apps") 26. Device 24 may comprise any suitable wireless or wireline device, such as, for example, a cellular phone or smartphone, a wireless-enabled laptop or tablet computer, a desktop personal computer, a video gaming console, a smart TV, a wearable device, an automotive user device, or any other suitable type of user device that is capable of presenting content to a user. The figure shows a single user device 24 for the sake of clarity. Real-life systems typically comprise a large number of user devices of various kinds.

In the present context, the terms "user application," "application" and "app" are used interchangeably, and refer to any suitable computer program that runs on the user device and may be invoked (activated) by the user. Some apps 26 may be dedicated, special-purpose applications such as game apps. Other apps 26 may be general-purpose applications such as Web browsers.

In some embodiments, although not necessarily, apps 26 are provided by and/or communicate with one or more network-side servers, e.g., portals 28, over a network 32. Network 32 may comprise, for example a Wide Area Network (WAN) such as the Internet, a Local Area Network (LAN), a wireless network such as a cellular network or Wireless LAN (WLAN), or any other suitable network or combination of networks.

In the present example, user device 24 comprises a processor 44 that carries out the various processing tasks of the user device. Among other tasks, processor 44 runs an Operating System (OS) 48, which in turn runs apps 26. The embodiments described herein refer mainly to the Android OS. The disclosed techniques, however, are applicable to any other suitable OS that may run on user devices, e.g., iOS, Windows, Linux and the like. OS 48 comprises a software component referred to as a preload agent 50, which handles preloading of apps. Apps 26, OS 48 and preload agent 50 are drawn schematically inside processor 44, to indicate that they comprise software running on the processor.

In addition, user device 24 comprises a Non-Volatile Memory (NVM) 54, e.g., a Flash memory. NVM 54 may serve, inter alia, for storing a cache memory 52 for caching content associated with apps. In some embodiments the user device uses a single cache 52. In other embodiments, also depicted schematically in the figure, a separate cache memory 52 may be defined per app. Hybrid implementations, in which part of cache 52 is centralized and some is app-specific, are also possible. For clarity, the description that follows will refer simply to "cache 52", meaning any suitable cache configuration.

User device 24 further comprises a display screen 56 for presenting visual content to the user, and a suitable network interface (not shown in the figure) for connecting to network 32. This network interface may be wired (e.g., an Ethernet Network Interface Controller—NIC) or wireless (e.g., a cellular modem or a Wi-Fi modem). Typically, user device 24 further comprises some internal memory, e.g., Random Access Memory (RAM)—not shown in the figure—that is used for storing relevant code and/or data.

In the example embodiment of FIG. 1, although not necessarily, system 20 further comprises a preload server 60 that performs preloading-related tasks on the network side. Server 60 comprises a network interface 64 for communicating over network 32, and a processor 68 that carries out the various tasks of the preload server. In the present example, processor 68 runs a preload control unit 72 that carries out network-side preloading-related tasks.

Network-side preloading-related tasks may comprise, for example, deciding which apps to preload and when, choosing whether and which in-app content to preload, deciding how much of an app component to preload (e.g., only executing some initial executable code, or pre-rendering of the app's user interface and/or deciding on the duration of foreground simulation). Another possible network-side preloading-related task may comprise, for example, deciding on an applicable preloading mode, e.g., off-line preloading in which access to the network is restricted or forbidden, or on-line preloading in which network access is permitted. Preloading modes are addressed, for example, in PCT Application PCT/IB2020/057046, whose disclosure is incorporated herein by reference. Yet another example is a "whitelist" of apps permitted to undergo preloading, as elaborated below. In an embodiment, preload server 60 may be implemented as a cloud-based application.

In the embodiments described herein, for the sake of clarity, preloading tasks are described as being carried out by processor 44 of user device 24. Generally, however, preloading tasks may be carried out by processor 44 of device 24, by processor 68 of server 60, or both.

Preloading an app 26 may involve preloading any app element such as executable code associated with the app, e.g., launch code, app feed, app landing page, various UI elements associated with the app, content associated with the app, app data associated with the app, and/or code or content that is reachable using the app by user actions such as clicks ("in-app content"). Pre-rendering of content may involve background processing of any suitable kind of UI display, or a portion thereof. In Android terminology, for example, pre-rendering may comprise background processing of one or more Android Activities. In the background mode, UI elements associated with the app are not presented to the user on display screen 56, i.e., are hidden from the user. When the user invokes a previously-preloaded app, the user device switches to run the app in a foreground mode that is visible to the user. (The terms "background mode" and "foreground mode" are referred to herein simply as "background" and "foreground," for brevity.)

The configurations of system 20 and its various elements shown in FIG. 1 are example configurations, which are chosen purely for the sake of conceptual clarity. In alternative embodiments, any other suitable configurations can be used. For example, in some embodiments the preloading tasks may be implemented entirely in processor 44 of user device 24, in which case subsystem 60 may be eliminated altogether.

Preloading agent 50 may be implemented in a software module running on processor 44, in an application running on processor 44, in a Software Development Kit (SDK) embedded in an application running on processor 44, as part of the OS running on processor 44 (possibly added to the OS by the user-device vendor or other party), in a proxy server running on processor 44, using a combination of two or more of the above, or in any other suitable manner. In most of the description that follows, preloading agent 50 is assumed to be part of OS 48 of user device 24.

Although the embodiments described herein refer mainly to human users, the term "user" refers to machine users, as well. Machine users may comprise, for example, various host systems that use wireless communication, such as in various Internet-of-Things (IoT) applications.

The different elements of system 20 may be implemented using suitable software, using suitable hardware, e.g., using one or more Application-Specific Integrated Circuits (ASICs) or Field-Programmable Gate Arrays (FPGAs), or using a combination of hardware and software elements. Cache 52 may be implemented using one or more memory or storage devices of any suitable type. In some embodiments, preloading agent 50 and/or preloading server 60 may be implemented using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Preloading of Activities, and Isolation Between Preloaded and Non-Preloaded Activities In some embodiments of the present invention, preload agent 50 in OS 48 of user device 24 preloads one or more UI displays of one or more apps, in order to reduce the latency experienced by the user. The description herein refers mainly to Android Activities as an example of UI display, but the disclosed techniques can be used for preloading any other suitable type of UI displays. The disclosed techniques are applicable, with certain variations, to preloading of individual Activities, apps and in-app content.

OS 48 typically maintains one or more "Tasks" of Activities. The term "Task" refers to a container used to store Activities that users interact with when performing a certain job. Activities stored in a certain Task may belong to a single app or to multiple different apps (e.g., when one app opens an Activity of another app).

In some embodiments OS 48 associates each Task with a "Task stack". The term "Task stack" refers to a container which holds different Tasks in a certain logical ordering, such as stack ordering (last-in, first-out). The ordering relates to the ordering of Activities being displayed, e.g., which Activity is displayed on top of which. OS 48 may also apply logical ordering among different Task stacks. In the Android OS, "Task stack" is sometimes referred to as "Activity stack".

When applying preloading, OS 48 takes various measures to keep the preloading operations unnoticeable by the user. Thus, for example, the OS ensures that preloaded Activities are invisible to the user, and that preloading operations do not affect the "recents" screen of the OS (also referred to as "overview screen," "recent task list," "recent apps," "recents view" or "recently used apps").

In some embodiments, OS 48 keeps the preloading operations unnoticeable by the user by isolating preloaded Activities and non-preloaded Activities in separate data structures, e.g., separate Tasks and Task stacks. When a preloaded Activity needs to be displayed to the user, the OS moves the activity from the data structures dedicated to preloaded Activities to the data structures dedicated to non-preloaded Activities.

Figure 2:
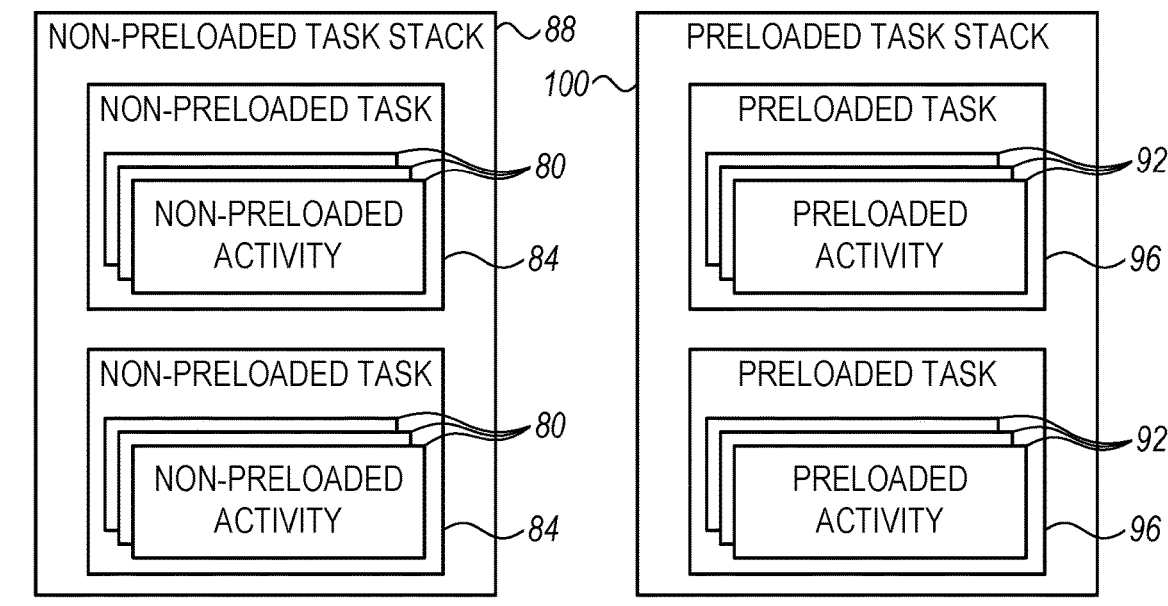
FIGS. 2 and 3 are diagrams that schematically illustrate data structures used for handling preloaded and non-preloaded Activities, in accordance with embodiments of the present invention.

FIG. 2 is a diagram that schematically illustrates data structures used by OS 48 for handling preloaded and non-preloaded Activities, in accordance with an embodiment of the present invention.

As seen, OS 48 is configured to handle multiple non-preloaded Activities 80. The non-preloaded Activities are associated with one or more "non-preloaded Tasks" 84. Each non-preloaded Task 84 is a stack that stores some of the non-preloaded Activities in a certain logical ordering. Non-preloaded Tasks 84 are associated with one or more non-preloaded Task stacks 88 (only one Task stack is seen in the figure, for clarity). Each Non-preloaded Task 84 is associated with one of the non-preloaded Task stacks 88.

OS 48 maintains a similar, but independent, hierarchy for preloaded Activities 92. Preloaded Activities 92 are associated with one or more "preloaded Tasks" 96. Each preloaded Task 96 is a stack that stores some of the preloaded Activities in a certain logical ordering. Preloaded Tasks 96 are in turn associated with one or more preloaded Task stacks 100 (again—only one preloaded Task stack is seen in the figure, for clarity). Each preloaded Task 96 is associated with one of the preloaded Task stacks 100.

Thus, in some embodiments, OS 48 stores the non-preloaded Activities in a hierarchy of data structures (non-preloaded Activities, non-preloaded Tasks and non-preloaded Task stacks). OS 48 stores the preloaded Activities in another, separate hierarchy of data structures (preloaded Activities, preloaded Tasks and preloaded Task stacks).

The isolation, or separation, between the handling of preloaded and non-preloaded Activities is typically characterized in that:

A non-preloaded Task holds only non-preloaded Activities, not preloaded Activities. A non-preloaded Task stack holds only non-preloaded Tasks, not preloaded Tasks. Similarly, a preloaded Task holds only preloaded Activities, not non-preloaded Activities; and a preloaded Task stack holds only preloaded Tasks, not non-preloaded Tasks.

Non-preloaded Activities, Tasks and Task stacks are not influenced by preloaded Activities, Tasks and Task stacks. For example, there is no stacking or other ordering between preloaded Tasks and non-preloaded Tasks; and there is no stacking or other ordering between preloaded Task stacks and non-preloaded Task stacks.

Preloading of Activities and/or creation of preloaded Tasks and Task stacks do not influence the "recents" screen of OS 48. Therefore, if a certain Task was on the recents screen, the Task will remain on the recents screen notwithstanding any operation applied to a preloaded Activity, preloaded Task or preloaded Task stack. By the same token, if a Task was not on the recents screen, it will not be added to the recents screen as a result of some preloading-related operation. Moreover, the order of appearance of Tasks in the recents view is not affected by preloading operations.

The data structures described above, and their handling by OS 48, simplify the implementation of preloading operations, and ensure that preloading operations are unnoticeable to the user.

Figure 3:
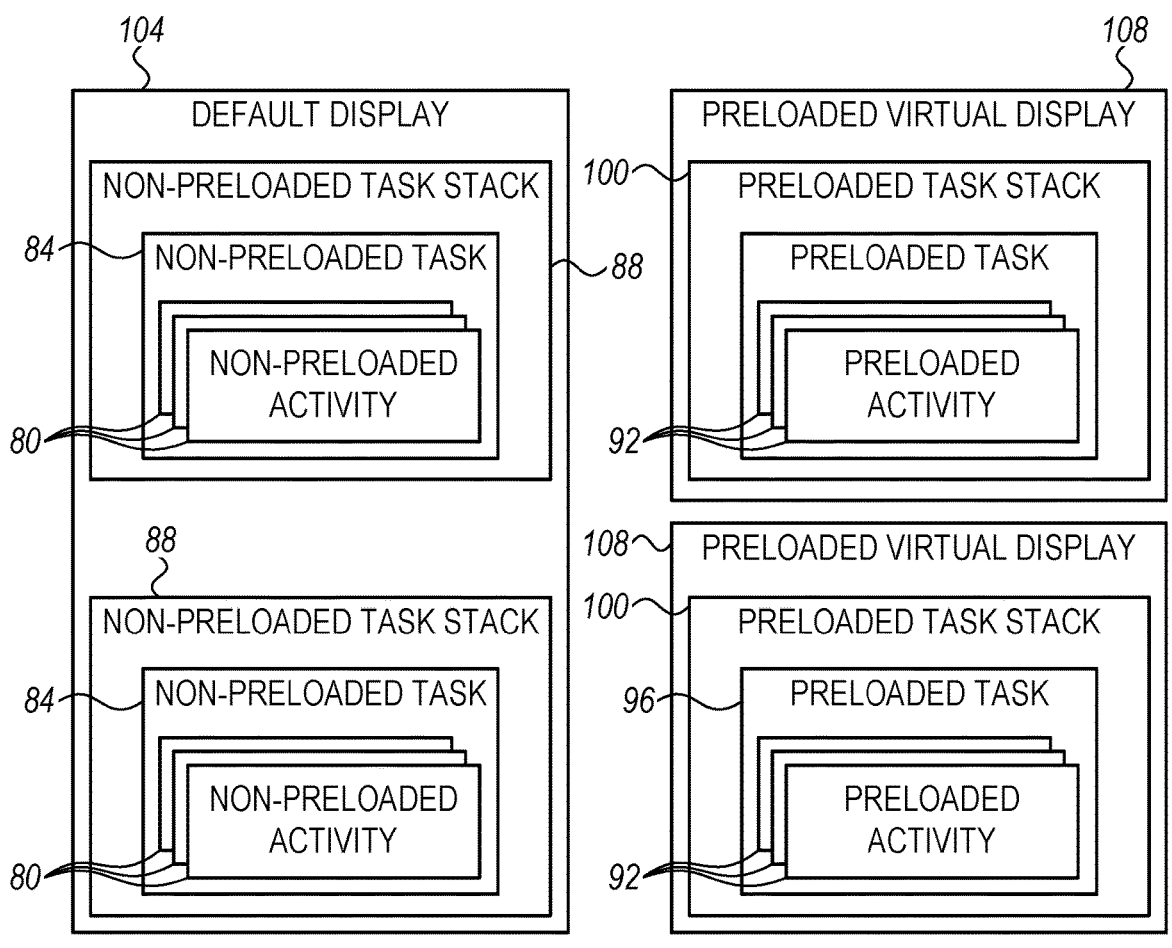

FIG. 3 is a diagram that schematically illustrates data structures used for handling preloaded and non-preloaded Activities, in accordance with another embodiment of the present invention. In this embodiment, OS 48 supports an additional level of hierarchy on top of the hierarchy of FIG. 2—That of a "Display".

In the present context, the term "display" refers to a logical construct, e.g., a container, for storing Activities. Each display has properties and a state. The properties are fixed attributes characterizing the display, such as height, width, density, color modes, supported refresh rates, as well as special capabilities such as High Dynamic Range (HDR). The state comprises variable attributes of the display, e.g., the display orientation (portrait or landscape). A display may be defined as a virtual display, i.e., a display that is not associated with physical hardware and its content is therefore not displayed to the user. Instead, a virtual display allows rendering content to a virtual surface, where a surface is an object holding pixels.

In some embodiments, OS 48 defines a default Display 104 (whose content is actually displayed to the user on display screen 56) and one or more virtual Displays 108 dedicated for preloading (and referred to as "preloaded virtual displays"). All non-preloaded Task stacks 88 are associated with default Display 104. Each preloaded Task stack 100 is associated with one of preloaded virtual Displays 108. In an example implementation there is one-to-one correspondence between preloaded Task stacks 100 and preloaded virtual Displays 108, i.e., each preloaded Task stack 100 is associated with a single respective preloaded virtual Display 108.

The additional hierarchy retains the above-described separation between preloaded and non-preloaded Activities. For example, default Display 104 comprises only non-preloaded Task stacks and no preloaded Task stacks; and a preloaded virtual Display comprises only preloaded Task stacks and no non-preloaded Task stacks.

The configuration of displays depicted in FIG. 3 is chosen purely by way of example. In alternative embodiments, any other suitable configuration can be used. For example, there need not necessarily be strict one-to-one correspondence between preloaded Task stacks 100 and preloaded virtual Displays 108, i.e., a certain virtual display 108 may comprise two or more preloaded Task stacks 100. As another example, the OS may maintain multiple regular (non-virtual) displays at the same time. Additional aspects of preloading using virtual Displays are addressed further below in the "Additional embodiments and variations" section.

Preloading of Activities Using Foreground Simulation

In some embodiments, preloading agent 50 preloads one or more Activities of one or more user apps 26 using a special operational mode that is referred to as "foreground simulation" or "simulated foreground". In this mode, app 26 processes the Activity in a foreground mode, but OS 48 keeps the Activity in a background mode that is hidden from the user. In other words, an Activity undergoing foreground simulation is in the foreground from the perspective of the app, and in the background from the perspective of the OS.

The foreground simulation mode enables the Activity to be preloaded, including pre-rendering and other suitable preloading-related operations, optionally using the existing app program code, while nevertheless keeping the Activity in the background, unnoticeable to the user.

In various embodiments, OS 48 may use various techniques for keeping an Activity in the background even though the app processes the Activity as if it is in the foreground. For example, preloading agent 50 may override one or more final system calls that cause the Activity window to be displayed on display screen 56 of user device 24. As another example, preloading agent 50 may associate the Activity with a virtual Display, which is not linked to an actual physical display. The use of virtual Displays for preloading is explained in detail below.

In some embodiments, preloading of an Activity comprises the following steps, or a subset thereof, possibly in a different order:

OS 48 decides that a certain Activity, of a certain app 26, is to be preloaded.

The OS grants the app permission to act as if the app runs in the foreground, as opposed to the possibly more restricted background state, but in actuality the OS keeps the app in the background. For example, the OS may grant the app permission to launch Activities.

If the process of the app in question is not alive, the OS creates an app process for the app.

If the Activity is not already associated with a Task, the OS creates a preloaded Task 96 for the Activity.

The OS marks the Activity as a preloaded Activity 92. This marking can be performed, for example, by marking the Activity itself, by marking the preloaded Task that holds the Activity, or implicitly, e.g., by placing the preloaded Task in a preloaded task Stack 100 that is marked as such, and/or by placing the preloaded Task in a preloaded Task Stack 100 which itself is marked as preloaded either explicitly or implicitly by placing that preloaded Task Stack in a preloaded Virtual Display 108.

If the preloaded Task 96 is not already associated with a preloaded Task stack 100, the OS creates a preloaded Task stack and associates the preloaded Task to this Task stack, or alternatively associates the preloaded Task with an existing preloaded Task Stack. In some embodiments the OS may maintain a single preloaded Task stack, which is either created on demand or ahead of time, or multiple Task stacks. For example, the OS can create a preloaded Task stack for each app, or for each preloaded Task.

In some embodiments, if the preloaded Task Stack 100 is not already associated with a preloaded Virtual Display

108, the OS creates a preloaded Virtual Display and associates the preloaded Task Stack to this preloaded Virtual Display, or alternatively associates the preloaded Task Stack with an existing preloaded Virtual Display. In some embodiments, the OS may maintain a fixed number of preloaded Virtual Displays, which are either created on demand or ahead of time, or a dynamic number of preloaded Virtual Displays. For example, the OS can create a preloaded Virtual Display for each app, or for each preloaded task Stack, or for each preloaded Task.

In some embodiments, the OS launches and initializes the app using the Activity's normal lifecycle events (e.g., in Android, using the app's OnCreate( ) method). In alternative embodiments, the OS launches and initializes the app using an event dedicated for the initialization of the app due to preload, e.g., OnCreateForPreload( ).

In some embodiments, the OS creates the preloaded Activity in the background, i.e., without displaying the Activity to the user, and calls the app's initialization code, using the Activity's normal lifecycle callbacks, e.g., OnCreate( ). Alternatively, the OS may create the preloaded Activity in the background, and call its initialization code, using an event dedicated for initializing the Activity due to preload, e.g., OnCreateForPreload( ).

The OS simulates the Activity transitioning to foreground, but in actuality keeps the Activity hidden from the user (as if the Activity was in the background), using the "foreground simulation" mode. In some embodiments, but not necessarily, foreground simulation allows the Activity to render in full while in the background.

Following a period of foreground simulation, the OS changes the state of the Activity to a normal background Activity.

In some cases, the user may enter a preloaded Activity (without being aware of the fact that the Activity is preloaded), for example by invoking the app. In such a case, the Activity should exit the preloaded state. User entry to a preloaded Activity may comprise the following steps or a subset thereof:

The OS marks the Activity as a normal, non-preloaded Activity (if currently marked otherwise).

The OS verifies that the Task holding the Activity is not a non-preloaded Task. As applicable, this verification can be performed by re-designating the previous Task of the Activity (the preloaded Task) to be a non-preloaded Task, or by moving the Activity to a different, possibly new, non-preloaded Task.

The OS verifies that the non-preloaded Task, which now holds the Activity, is associated with a non-preloaded Task stack. In some embodiments, the OS removes the non-preloaded Task from the preloaded Task stack, and re-parents the task into either an existing or a new, non-preloaded task Stack. In some embodiments, the OS just marks the existing Task Stack which holds the non-preloaded Task as non-preloaded. This may be done either explicitly, or implicitly by re-parenting the existing Task Stack into a non-preloaded target Display.

In some embodiments, the OS verifies that the display holding the non-preloaded Task Stack is associated with a non-preloaded Display. In some embodiments this includes re-parenting the Task Stack into a non-preloaded target Display.

The OS makes the preloaded Activity visible to the user, moving it to the regular foreground state.

The OS calls any relevant callback functions which may relate to the exiting of the Activity or the app from the preloaded state.

Figure 4:
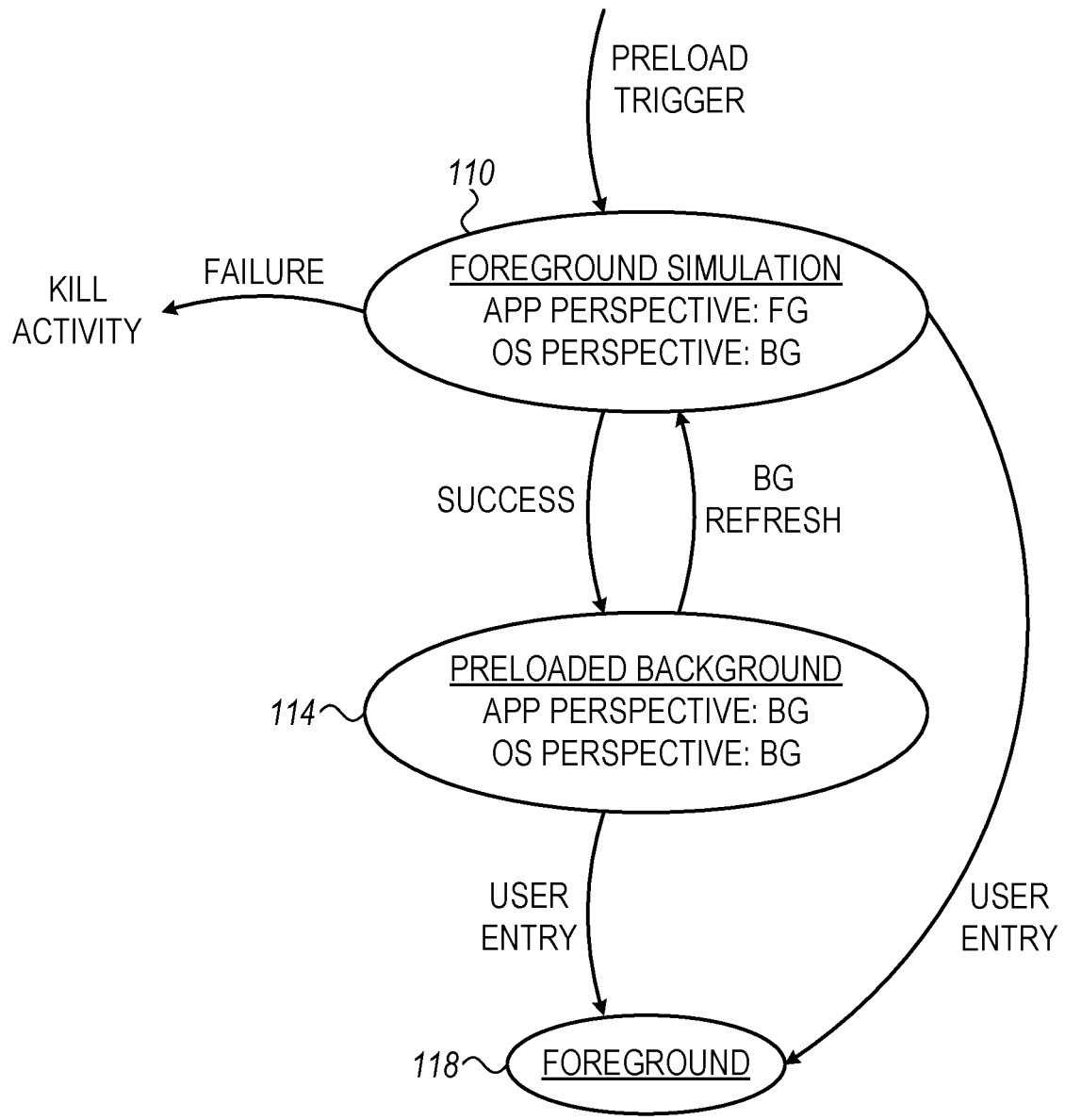
FIG. 4 is a state diagram that schematically illustrates preloading of an Activity, in accordance with an embodiment of the present invention.

FIG. 4 is a state diagram that schematically illustrates a preloading process, in accordance with an embodiment of the present invention. This state diagram can be used by OS 48, possibly with certain variations, either for preloading an Activity that belongs to a certain app, or from preloading the app itself. An Activity that is preloaded using this state diagram may be, for example, a start-up Activity of an app or an Activity that is part of the in-app content. For simplicity and clarity, however, the description that follows refers mainly to preloading of an individual Activity. Preloading of apps is addressed in greater detail further below.

The preloading operation begins with a preload trigger, i.e., an event that causes OS 48 to decide to preload the Activity. In response to the preload trigger, preloading agent 50 transitions the Activity to a "foreground simulation" state 110. As explained above, in this state the app treats the Activity as a foreground Activity, whereas the OS treats the Activity as a background Activity. While the Activity is in the foreground simulation state, agent 50 launches the Activity in the background and pre-renders it, at least partially.

At some stage, agent 50 decides to end the foreground simulation. Several example completion criteria for ending the foreground simulation are discussed further below. Assuming no error occurs during foreground simulation, preloading agent 50 transitions the Activity from foreground simulation state 110 to a "preloaded background" state 114. If an error occurs during foreground simulation, preloading agent 50 may terminate ("kill") the Activity.

In the preloaded background state, both the OS and the app treat the Activity as a background Activity. In this state the Activity is static and waiting in the background. In some embodiments, while the Activity is in preloaded background state 114, preloading agent 50 may decide to refresh the Activity in the background. In such a case agent 50 transitions the Activity back to foreground simulation state 110.

Upon user entry, e.g., when the user launches the app by clicking on the app's icon, agent 50 transitions the Activity from preloaded background state 114 to a "foreground" state 118. In this state the Activity becomes visible to the user. By virtue of the preparation and pre-rendering operations, which were performed in the foreground simulation state, the transition to foreground state 118 is fast. As seen in the figure, direct transition from foreground simulation state 110 to foreground state 118 is also possible, in case of user entry during foreground simulation.

The state diagram of FIG. 4 is an example state diagram that is depicted purely for the sake of conceptual clarity. In alternative embodiments, OS 48 may carry out the disclosed technique using any other suitable configuration of states and transitions. Additional implementation details and possible variations are given below.

In some embodiments, in an Android implementation, upon entry into foreground simulation state 110, agent 50 sets the Activity to a 'resumed' state, marks the Activity and its windows as 'visible', and marks the Activity to be in 'focus'. Nevertheless, from the user's perspective, the Activity is being rendered to the background, and is therefore invisible to the user. Upon transitioning from foreground simulation state 110 to preloaded background state 114, agent 50 changes the 'visible' and 'focused' signals of the Activity back to indicate that the Activity is not visible and not in focus, with any related callbacks invoked, and in addition changes the Activity state to 'paused' and/or to 'stopped'.

In some embodiments, agent 50 transitions an Activity into and out of foreground simulation state 110 using existing lifecycle events of the Android OS that relate to entry into and exit from foreground. These lifecycle events may comprise, for example, OnStart( ) and/or OnResume( ) for entering foreground simulation, and OnPause( ) and/or OnStop( ) for exiting foreground simulation. This sort of implementation simplifies the integration of the app with the preloading feature, since the app is able to use its normal, non-preload, Activity related code flows.

In alternative embodiments, agent 50 uses new, dedicated events for transitioning an Activity into and out of foreground simulation state 110. These new lifecycle events are dedicated for preload operations, and are different from the events used for normal Activity handling. Such dedicated events may comprise, for example, OnSimulatedStart( ) OnSimulatedResume( ) OnSimuatedPause( ) OnSimulatedStop( ) etc.

In some embodiments, OS 48 notifies the app of the fact that the Activity is being preloaded. Such a notification may be performed, for example, using a suitable Application Programming Interface (API) provided by the OS to the app. For example, an API of the form 'boolean isPreloaded (Activity activity)' can be made available to the app, e.g., by a Software Development Kit (SDK). This method allows the app to check whether a certain Activity is preloaded. When the activity parameter is omitted, the query/notification is interpreted as a general query/notification as to whether the app itself is considered preloaded.

In some embodiments, when an app or Activity is being preloaded, the app refrains from performing certain actions which the app prefers to perform only when the app/Activity actually being used by the user. Such deferred actions may comprise, for example, running analytics code, fetching and rendering of certain content, fetching and rendering of content that is not immediately displayed to the user upon entry, and the like. In some embodiments, OS 48 provides the app with an API (e.g., by an SDK) that allows the app to register one or more callback functions to be used upon user entry after preload. The OS calls these functions upon user entry to a preloaded Activity or preloaded app. This feature enables the app to complete any actions that were skipped during preloading, e.g., run relevant analytics code, refresh the previously preloaded UI, start video playback, etc.

As noted above, preloading agent 50 may use various completion criteria for deciding to end foreground simulation for a certain Activity, and to transition to preloaded background state 114. In one embodiment, agent 50 continues the foreground simulation until the Activity is fully rendered in the background, and only then transitions to preloaded background state 114. In other embodiments, the foreground simulation stage is limited in time to not exceed a defined time-out duration. The time limit may be implemented, for example, by using a programmatic timer and/or by using an API supplied to the app (e.g., by an SDK).

In one embodiment, no API is used, and time-out expiry indicates that preloading is completed successfully. Upon successful completion, agent 50 considers the preloaded Activity suitable for future display, and transitions from "foreground simulation" to "preloaded background." As noted above, if the app indicates that an error occurred during preloading, agent 50 may terminate the preload procedure, e.g., by destroying the Activity/app.

In another embodiment, in addition to the time-out mechanism, OS 48 provides the app with an API that enables the app to indicate whether preloading has succeeded or failed. If the app indicates that preloading has succeeded, the OS acts as if the timer has expired, stops the timer and transitions to "preloaded background." If the app indicates that the preloading has failed (e.g., due to a network problem when fetching content to be rendered), the OS may terminate the preloading procedure, e.g., by destroying the Activity/app being preloaded. In an embodiment, if the time-out expires before the app indicates successful preloading, the OS may regard the preload as failed, and may terminate the preloading procedure, e.g. by destroying the Activity/app being preloaded.

The above-described failure scenarios are important to consider, in order to ensure that OS 48 does not display an Activity whose preloading has failed, and thus ensure that preloaded content shown to the user is intact. For example, if a network error occurs while an app is being preloaded, the failure scenario avoids showing an error to the user later, where the error condition may no longer be in effect.

Background Preloading of Activities Using Foreground Lifecycle Events

Figure 5A:
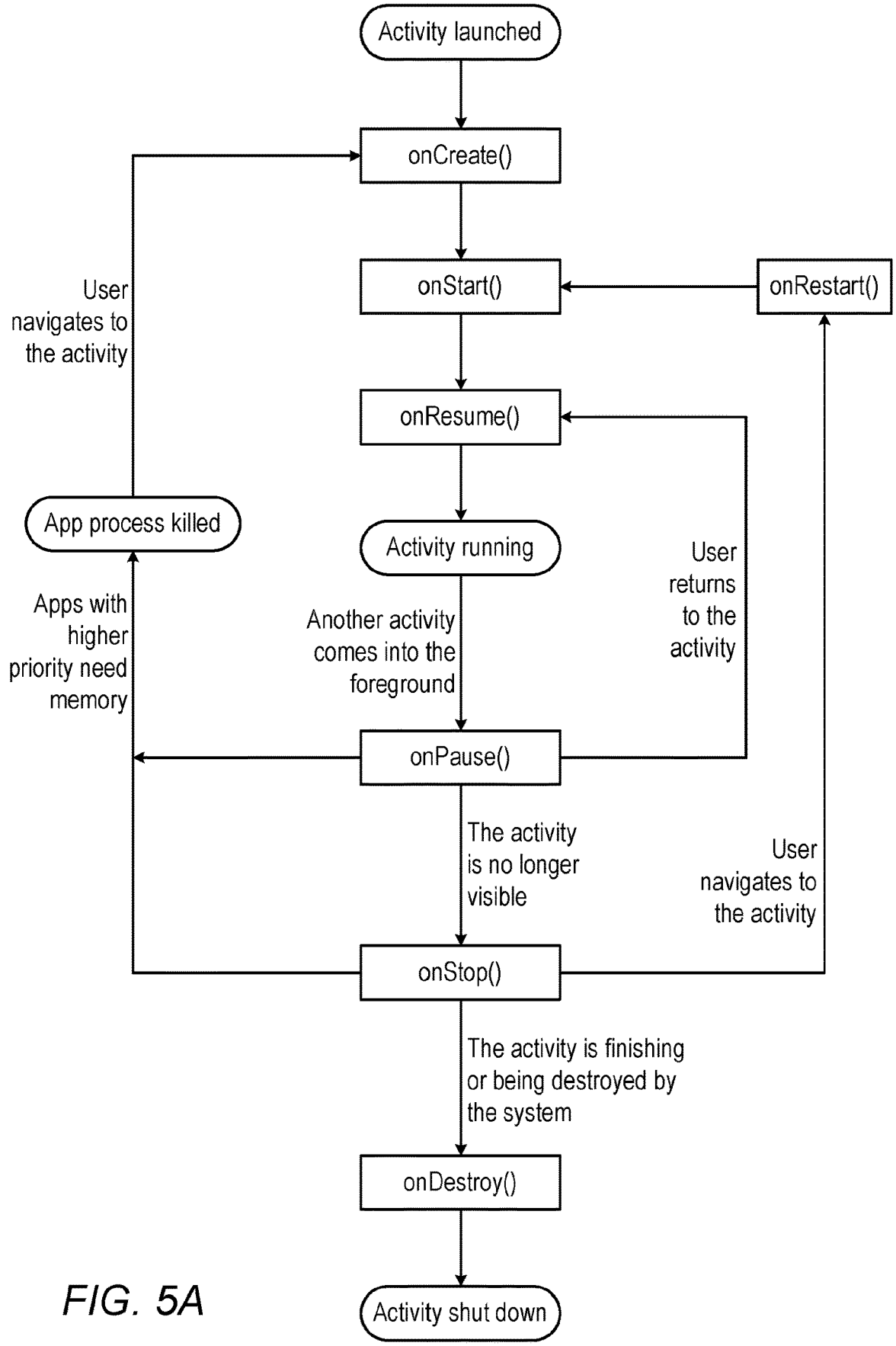
FIGS. 5A and 5B are state diagrams that schematically illustrate lifecycle states of a foreground-loaded Activity and of a background-preloaded Activity, respectively, in accordance with an embodiment of the present invention.
Figure 5B:
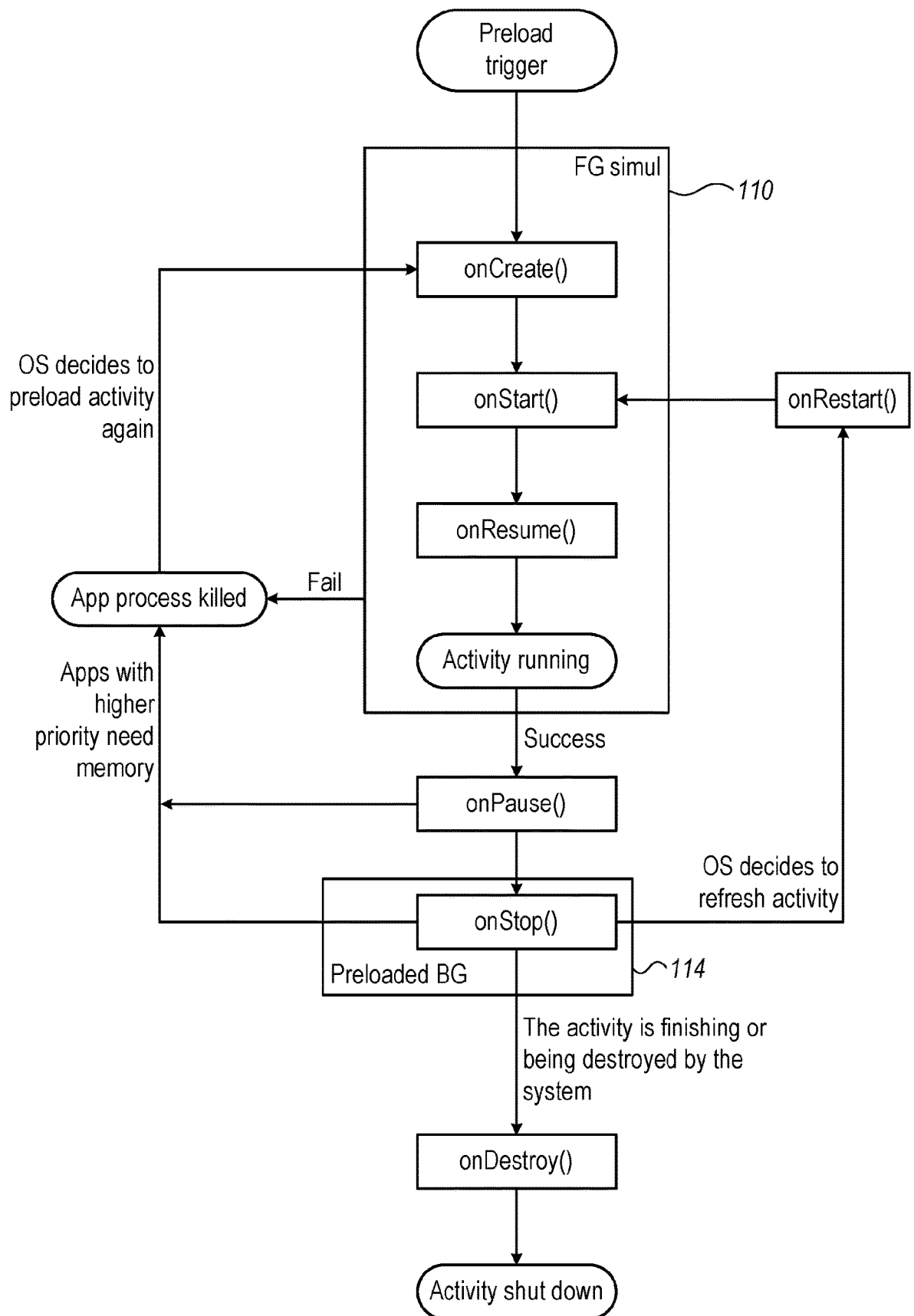

FIGS. 5A and 5B are state diagrams that schematically illustrate lifecycle states (also referred to as lifecycle events) of a foreground-loaded Activity and of a background-preloaded Activity, respectively, in accordance with an embodiment of the present invention. FIGS. 5A and 5B demonstrate how, in some embodiments, background preloading of Activities may be implemented using existing OS lifecycle events/states that are designed for conventional foreground processing of Activities.

As seen in FIG. 5A, the lifecycle of a foreground Activity begins when the Activity is launched. The Activity then passes through the onCreate( ), onStart( ) and onResume( ) states, which end with the activity running.

If another Activity comes into the foreground, the original Activity transitions to the onPause( ) state. After a certain time, and when the Activity becomes no longer visible, it proceeds to the onStop( ) state. If the Activity finishes execution or is destroyed by the OS, the Activity passes to the onDestroy( ) state, and is then shut down.

When in the onPause( ) state, if the user returns to the original Activity, the Activity returns to the onResume( ) state and then continues running. Also in the onPause( ) state, if an app having higher priority compete for memory resources, the OS may kill the app process of the Activity. Later, if the user navigates to the Activity, the activity starts from the onCreate( ) state.

When in the onStop( ) state, if the user navigates to the Activity, the Activity passes to the onRestart( ) state, and on to the onStart( ) state. Also in the onStop( ) state, if an app having higher priority compete for memory resources, the OS may kill the app process of the Activity. Later, if the user navigates to the Activity, the activity starts from the onCreate( ) state.

FIG. 5B illustrates a possible use of the Android foreground lifecycle states of FIG. 5A in preloading an Activity, in accordance with an embodiment of the present invention. In this example, the lifecycle of a preloaded Activity begins with a preload trigger. In response to the preload trigger, preload agent 50 transitions the Activity to foreground simulation state 110 (as in FIG. 4 above). In the present example the flow of the foreground simulation process is implemented using the onCreate( ) onStart( ) and onResume( ) states. For a preloaded Activity, however, as opposed to a foreground Activity as in FIG. 5A, OS 48 keeps the Activity in the background, e.g., by overriding system calls that display the Activity on display screen 56 of user device 24.

The transition condition from "Activity running" to the onPause( ) state also differs between a foreground Activity (FIG. 5A) and a preloaded Activity (FIG. 5B). For a preloaded Activity, agent 50 transitions the Activity to the onPause( ) state upon successful completion of the foreground simulation. If foreground simulation fails, e.g., due to a network problem, the OS may destroy the app process of the Activity as described above, possibly in addition to finishing of the preloaded activity From the onPause( ) state the preloaded Activity proceeds to preloaded background state 114, which in the present example is implemented using the onStop( ) lifecycle state.

When in the onStop( ) state, if the OS (typically agent 50) decides to refresh the Activity, the Activity passes to the onRestart( ) state, and on to the onStart( ) state. If the Activity has been killed by the OS, the OS may later decide to preload the Activity again. In such a case the activity passes back to the onCreate( ) state.

For the sake of clarity, FIG. 5B does not show transitions that are triggered by the user navigating to the Activity. Such triggers cause the Activity to pass to foreground mode, not to foreground simulation. For example, user navigation to the Activity when in the onStop( ) state will cause the Activity to pass to the onRestart( ) state but in foreground mode; user navigation to the Activity when in the onPause( ) state will cause the Activity to pass to the onResume( ) state but in foreground mode; and user navigation to the Activity after it has been killed state will cause the Activity to pass to the onCreate( ) state but in foreground mode.

The lifecycle states/events and transition conditions described above are depicted purely by way of example. In alternative embodiments, any other suitable arrangement of lifecycle events/states can be used. Further aspects of implementing preload using OS lifecycle events are addressed in U.S. Provisional Patent Application 63/128,220, cited above.

Preloading of User Applications

The description up to this point referred mainly to preloading of individual Activities. In some embodiments, preloading agent 50 of OS 48 uses the disclosed techniques for preloading a user app 26 as a whole, before the user requests activation of the app. Preloading an app (referred to herein as "AppPreload") typically involves preloading of a selected subset of the app's Activities, thereby reducing the app start-up latency significantly.

In some embodiments, in preloading an app, agent 50 follows and simulates the normal app startup sequence, by preloading the app's entry-point Activity (sometimes referred as the launcher Activity or splash screen). Then, agent 50 may optionally preload one or more additional Activities that the app normally starts as part of its normal startup sequence. Agent 50 typically preloads each selected Activity, entry-point or otherwise, using the techniques described above, e.g., using foreground simulation.

In some embodiments, if the app invokes an Activity while the app is being preloaded, agent 50 verifies that the invocation is preload-initiated, as opposed to user-initiated. If so, agent 50 preloads the Activity. In some embodiments, if such an Activity would have normally required a new Task, agent 50 creates a new preloaded Task for that Activity and associates that Activity with the new preloaded Task. Further aspects relating to distinguishing between preload-initiated or user-initiated Activities are addressed in PCT International Publication WO 2019/171237, cited above.

In some embodiments, agent 50 places the various Activities preloaded during the launch sequence in the same preloaded Task. In some embodiments, agent 50 creates preloaded Tasks according to the app's normal launch sequence, wherein for each Task that would have been created normally, agent 50 creates an a matching preloaded Task. In some embodiments, each preloaded app is allocated a separate preloaded Task stack, which contains the various preloaded Tasks and preloaded Activities of that app. In some embodiments, each preloaded app is allocated a separate preloaded virtual Display, which contains the app's preloaded Task Stack.

In some embodiments, when the user enters the preloaded app, agent 50 ensures that the app will be displayed in its initial state. In some embodiments, when preparing to preload an app, agent 50 checks whether the app already has one or more living Activities. If so, agent 50 kills the living Activities and Tasks of the app before beginning preloading. Agent 50 may, for example, destroy the app processes that hold the living Activities and Tasks. In some embodiments, upon preloading an app, if the app already has one or more living processes, agent 50 destroys and/or finishes them before beginning preloading.

In some embodiments, agent 50 preloads an app only in response to verifying that the app is not currently in the foreground.

In some embodiments, agent 50 will preload an app only in response to verifying that the app does not have any living process. In some embodiments, agent 50 will preload an app only in response to verifying that all the processes that are normally started during normal app launch are not alive. In some embodiments, agent 50 will preload an app only in response to verifying that certain specific processes are not alive. The selection of such specific processes may depend on a defined configuration.

In some embodiments, agent 50 will preload an app only in response to verifying that the app does not have processes which have any live app components of one or more specified types. Such types may comprise, for example, Activities, broadcast receivers, services, content providers, widgets, notifications, or any other suitable type of app component.

In some embodiments, agent 50 will preload an app only in response to verifying that the app does not have any live Activities. In some embodiments, agent 50 will preload an app only in response to verifying that the app does not have specific Activities alive, referred to herein as target Activities. The target activities may be configured per app, e.g., via an API. In some embodiments, the app configures exactly one target activity, referred to as its "main Activity", which is normally preloaded during the preloading of the app.

In other embodiments, agent 50 may preload an app even though the app has live components, but only if the app is regarded as "Not-Recently-Used" (NRU). An app will be regarded as NRU, for example, if the time elapsed since the app was last used by the user exceeds a defined value.

Typically, as noted above, the recents screen of OS 48 is unaffected by preloading of apps. Thus, when the recents screen requests a Task that was replaced with a preloaded Task, OS 48 provides the recents screen with the up-to-date Task, instead of attempting to bring the previous Task to the foreground (possibly failing because the previous Task no longer exists) or creating a new Task. In some embodiments, this feature is implemented by maintaining a mapping between the latest Task saved by the recents screen and the latest preloaded Task, per app (e.g., per app package), per user. In other embodiments, this feature is implemented by maintaining a mapping between {app package, user} and the latest preloaded Task for the {app package, user}.

In some embodiments, app usage metrics maintained by OS 48 are unaffected by preloading of apps. In this context, app usage metrics may comprise, for example, last-used timestamp for each app or app package, process priority ordering that is usually based on recent usage times (e.g., Least-Recently-Used order), previously used process, and the like.

In some embodiments, agent 50 preloads apps according to least-recently-used usage metrics. In some embodiments, agent 50 preloads an app following a user exit from the app. In some embodiments, agent 50 preloads an app following a user exit from the app, in case such exit caused one or more of the app's Activities to be killed. This scenario may occur, for example, as a result of the app being swiped-off from the recents screen, or by exit using the back button.

In some embodiments, preloading an app does not affect decisions of OS 48 relating to initiation of power-saving states, e.g., whether or not and when to initiate App Standby. Thus, for example, preloading of an app is not regarded app usage for the purpose of power-saving decisions.

In some embodiments, during the preloading of an app, OS 48 temporarily turns off battery saving states, e.g., in order to allow the app to download and/or to render content.

In some embodiments, when preloading of an app is completed, the app and all of its Activities are moved to a normal background state, e.g., paused or stopped states.

In some embodiments, preloading agent 50 sets an upper limit on the overall time duration of preloading the app. This upper limit may be set instead of, or in addition to, the time limit on preloading of each individual Activity (the time-out before transitioning from foreground simulation state 110 to preloaded background state 114 in FIG. 4). The time limit can be implemented, for example, using a programmatic timer and/or using an API provided to the app (e.g., by an SDK)—similarly to the time-out implementation relating to individual Activities. In an example embodiment, an API may allow the app to declare that preloading of the app completed successfully, as opposed to successful preloading of an individual Activity.

In some embodiments, when the user enters a preloaded app, OS 48 presents some preliminary UI animation and/or Starting Window before displaying the preloaded Activity or Activities. In one embodiment this animation and/or Starting Window is the same as would be displayed if the app were not preloaded. In another embodiment, the OS presents a certain animation and/or Starting Window when the app is preloaded, and a different animation and/or Starting Window when the app is not-preloaded. In the latter case, the OS may use an animation and/or Starting Window dedicated specifically for the case of user entry after preload, e.g., as an indication to the user that the app being entered was preloaded.

In some embodiments, the preloading of apps supports a multi-user environment in user device 24. For example, in some embodiments OS 48 ensures that preloaded Tasks of one user cannot be accessed or otherwise used by another user. In some embodiments the OS maintains a different preload policy per user.

In some embodiments, OS 48 gives preloading a lower processing priority than UI foreground-related jobs. In some embodiments, processing resources allocated to preloading are confined to a small portion of the available processing resources, after prioritizing UI foreground-related jobs. In some embodiments, preloading is performed under Android's background Cgroup.

In some embodiments, OS 48 provides testing tools for app developers, in order to simulate the preloading of apps. In some embodiments in which preloading of apps can be done in multiple modes, e.g., as described in above-cited PCT Application PCT/IB2020/057046, the simulation of preloading supports all of the possible modes.

In some embodiments, app preloading is used to accelerate the start-up time of apps, such as games, in which a substantial processing effort occurs upon app launch.

In some embodiments, app preloading is performed in such a way that the processing being performed during preload remains relevant to the user for a substantial duration of time. For example, preloading may exclude content items that change rapidly, e.g., by more than a predefined rate. One example is preloading at least part of the landing page of an app (e.g., a game) whose landing page rarely changes over time. This allows the OS to preload such apps, e.g., games, only once in a while and possibly during preferable times (e.g., when the user device is connected to a power supply), and still maintain high likelihood for the preloaded app to be used by the user as it is, without needing to refresh the preloaded content (e.g. upon user entry).

In some embodiments, app preloading is used to accelerate the startup time of apps that require specific device resources (e.g., GPU resources) such as games. In some embodiments, preloading of such apps is performed when device resources are available/abundant.

In some embodiments, app preloading excludes fetching of content over the network. In some embodiments, accessing to the network is prohibited by the OS during preloading. In some embodiments, app preloading is limited to rendering of content that already exists in the user device (e.g., in Flash memory), e.g., content that is embedded in the app itself or resides in a temporary cache (e.g., cache of items previously fetched from over the network, such as cache 52 of FIG. 1).

In some embodiments, at least some of the app preloading functionality is integrated into an app development framework or 3$^{rd}$-party SDK, e.g., a game framework (also known as a game engine) or an analytics SDK. Such an app development framework is referred to herein as an App Preloading Integrated Framework. In some embodiments such integration is implemented by supplying a suitable plugin for such framework or SDK. In some embodiments, using an App Preloading Integrated Framework replaces some or all of the app preloading API integration steps (which would otherwise be needed by apps, in order to utilize or better utilize app preloading). In some embodiments, using an App Preloading Integrated Framework reduces or simplifies the integration effort of apps with app preloading API. In some embodiments, the app preloading API is given to apps as part of an Integrated Framework.

In some embodiments, when deciding whether or not to preload an app, OS 48 considers the type of app that is to be preloaded, e.g., that the app is a game. In some embodiments, when deciding whether or not to preload an app, OS 48 may consider the kind of framework or frameworks used by the app, and whether or not it is an App Preloading Integrated Framework.

Preloading of In-App Content

In some embodiments, preloading agent 50 of OS 48 uses the disclosed Activity preloading techniques, e.g., techniques relating to foreground simulation, for preloading in-app content, e.g., in-app Activities. Preloading of in-app content is referred to herein as "InAppPreload". In the present context, the term "in-app Activity" refers to an Activity that is not immediately displayed to the user upon app launching, but possibly displayed later based on an event such as user interaction with the app.

Note that preloading of in-app Activities may be performed both for apps that are kept in the background (e.g., preloaded apps) and for apps that run in the foreground (e.g., apps that were launched and are currently in use by the user). In some embodiments, the preloading of in-app Activities is performed while the app is in the background, after the app itself has been preloaded. In either case, preloading of in-app Activities allows a significant reduction of the latency experienced by the user. The latency is reduced since the Activity is at least partially ready in memory when the app needs to display it, e.g., in response to a user click of an in-app link.

In some embodiments, agent 50 in OS 48 maintains a cache of preloaded in-app Activities. This cache is typically implemented in the user device RAM. Each Activity preloaded by the OS is saved to this cache. Activities which may be preloaded, or intents to create such Activities, are assigned by the OS respective unique and stable identifiers (IDs) that are used as their cache keys. Typically, although not necessarily, the app initially assigns the ID by calculating it over the intent to create the Activity. When the app requests to launch an in-app Activity, agent 50 calculates the unique ID of that Activity and compares it against the unique IDs of the Activities cached in the in-app activity cache. If a match is found, OS 48 displays the cached Activity instead of creating a new Activity. If no match is found, OS 48 creates the Activity as it would normally be created without preloading.

In some embodiments, the app uses an API provided by the OS (e.g., through an SDK) to map Activities, or intents to create an Activity, to a unique and stable ID.

In some embodiments, agent 50 assigns each Activity in the in-app Activity cache an expiry timestamp. In such embodiments, OS 48 serves a preloaded Activity from the cache (instead of creating a new Activity) only if the expiry time of the cached Activity has not expired. In some embodiments, upon expiry of an Activity, the Activity is destroyed. Agent 50 typically assigns the expiry timestamp upon preloading of the Activity, and sets the expiry time as the preloading time plus a certain Time-To-Live (TTL) duration. In some embodiments, the TTL is fixed across all in-app Activities and across all apps. In some embodiments, the TTL is fixed across all Activities of the same app. In some embodiments, the TTL is set dynamically. In some embodiments the TTL is set dynamically based on a configuration set by the app, e.g., through an API.

In some embodiments, the number of Activities kept in the in-app activity cache is limited. In some embodiments, agent 50 limits the total number of Activities that may be resident in memory for a given app, including both preloaded Activities and non-preloaded Activities, which are Activities regularly launched by the app. In some embodiments, the limit on the number of cached Activities is fixed. In other embodiments the limit is set dynamically and may depend on a current state of the user device (e.g., on available resources), hardware type (e.g., total RAM and/or CPU power), app type, app usage frequency, app usage pattern, or on any other suitable factor.

In some embodiments, agent 50 assigns each preloaded in-app Activity its own separate preloaded Task 96. In other embodiments, agent 50 groups (e.g., stacks) preloaded in-app Activities in multiple preloaded Tasks 96. In yet other embodiments, agent 50 groups (e.g., stacks) all preloaded Activities in a single preloaded Task 96. In some embodiments, each preloaded Task 96 resides in its own preloaded Task stack 100. In some embodiments, all preloaded Tasks 96 reside within the same preloaded Task stack 100. In yet further embodiments, all preloaded Tasks of the same app reside within the same preloaded Task Stack. In some embodiments, the preloaded Task Stacks used for in-app Activities reside within a preloaded Virtual Display 108, as will be explained in detail below.

In some embodiments, preloading agent 50 selects in-app Activities to preload, based on suggestions and ranking (prioritization) of potential target Activities to be preloaded. In some embodiments, OS 48 provides the app an API for suggesting and ranking potential target Activities to be preloaded. In some embodiments, the app may call the API at various points in time while the app is running, in order to adapt the suggested and ranked potential target Activities, e.g., to the momentary state of the app, e.g., depending on which content items are currently reachable and/or visible to the user.

In some embodiments, when an app having preloaded in-app Activities is moved by the OS from the foreground to the background, in-app Activities that were preloaded while the app was in the foreground are kept for a limited duration. This feature allows sensible usage of RAM, while still allowing the user to switch to a different app and back without losing the preloaded Activities. In some embodiments, the limited duration is fixed across all Activities and all apps. In other embodiments, the limited duration is fixed across all Activities of the same app. In yet other embodiments, the limited duration is set dynamically. In some embodiments the limited duration is set dynamically based on configuration set by the app, e.g., through an API.

In some embodiments, agent 50 preloads in-app Activities one-by-one, i.e., not concurrently. In some embodiments, agent 50 preloads in-app Activities concurrently, and possibly maintains a concurrency limitation. The limitation defines the number of concurrent preloads that the OS will perform at any given point. The OS may set this limitation to a fixed size or dynamically, depending on current conditions. Setting a higher concurrency limitation may contribute to the activity cache hit-rate, and may also reduce battery consumption due to bundling of preload actions. On the other hand, a higher concurrency limitation may consume more device resources such as CPU and GPU processing. Therefore, the concurrency limitation (either dynamic or static) setting may depend on factors such as current device state (e.g., available resources), hardware type (e.g., total RAM, CPU type), app inputs (e.g., projected processing required or allocated to preload) and/or whether the app is running in foreground or background mode.

In some embodiments, when the user enters a preloaded in-app Activity, OS 48 shows a preliminary UI animation before displaying the preloaded Activity. Such UI animation may be the same animation which would have been shown had the user entered a non-preloaded Activity, or a different animation (e.g., an animation dedicated specifically for the case of user entry after preload). A dedicated animation may comprise, for example, an indication for the user that he or she is entering an Activity that was preloaded.

In some embodiments, the in-app Activity preloading functionality is integrated into an app development framework or $3^{rd}$-party SDK, e.g., a game framework (also known as a game engine), or an analytics SDK. Such an app development framework is referred to herein as an InAppPreload Integrated Framework. In some embodiments such integration is implemented by supplying an InAppPreload plugin for such a framework or SDK. In some embodiments, using an InAppPreload integrated framework replaces some or all of the InAppPreload API integration steps (which would otherwise be needed by apps, in order to utilize or better utilize InAppPreload). Using an InAppPreload integrated framework reduces or simplifies the integration effort of apps with InAppPreload API. In some embodiments, the InAppPreload API is given to apps as part of an integrated framework.

In some embodiments, when deciding whether or not to preload in-app Activities, agent 50 considers the resources required by an Activity to preload. Such resources may comprise, for example, power drain, use of cellular data, memory, CPU resources, GPU resources, or any other relevant resource. In some embodiments, agent 50 learns this information over time, e.g., by measuring the resources being consumed during preload. In some embodiments, the app at least partially declares (e.g., through an API) its requirements for at least part of such device resources.

In some embodiments, OS 48 supplies tools for app developers, in order to simulate the preloading of in-app Activities.

Additional Embodiments and Variations

Preloading Using Virtual Displays

The concept of preloaded virtual Displays 108 was described above with respect to FIG. 3. In various embodiments, preloading agent 50 of OS 48 may use preloaded virtual Displays 108 in various way to preload Activities.

In some embodiments, when preloading an app or an Activity, preloading agent 50 creates the app or Activity inside a preloaded virtual Display 108. Prior to being shown to the user, e.g., in response to user entry to the app, agent 50 transfers the app or Activity to a regular Display and displays it there. The regular Display to which preloaded content is transferred is referred to herein as a "target Display."

In some embodiments, OS 48 maintains only one regular Display (e.g., default display 104 of FIG. 3), which serves as the target Display for all preloaded apps and Activities. In other embodiments, OS 48 maintains multiple regular Displays. In such embodiments, agent 50 typically determines the target Display based on the semantics of the user request. For example, the app or Activity may be transferred to the regular Display in which the app or Activity would normally have been launched without preloading. In some embodiments, the app or Activity is transferred from the preloaded virtual Display to a regular Display upon user request to see the app's content, e.g., upon the user clicking on the app's icon.

When using foreground simulation as described above, agent 50 may transfer the app or Activity from a preloaded virtual Display 108 to a regular Display (e.g., default Display 104) when foreground simulation is complete. In the regular display, agent 50 places the app or Activity in a background state, ready to later be used by the user.

In some embodiments, OS 48 maintains a single preloaded virtual Display 108, which is used for all preload operations. In such embodiments, agent 50 limits preload operations (e.g., the duration of foreground simulation, or the entire duration of an app in preload state) to one preload operation at a time, in order to avoid cross-effects between different preloaded apps. The single preloaded virtual Display 108 can be created as part of the system initialization, or on-demand upon the first time a preload operation is requested.

In alternative embodiments, OS 48 creates and maintains multiple preloaded virtual Displays 108, e.g., per preloaded Task stack 100, per preloaded app, per preloaded Task 96, or per preloaded Activity 92. In an example embodiment, agent 5 may create a preloaded virtual Display 108 even for one preload operation, and destroy the preloaded virtual Display after the preloaded content is transferred to a regular Display. Multiple preloaded virtual Displays may exist in parallel, each for a different preload operation. This fine granularity helps avoiding cross-effects of a preload operation over other Tasks, Task stacks, apps, or Activities, preloaded or otherwise. As an alternative to destroying a preloaded virtual Display 108, the preloaded virtual Display may be cached by agent 50 in memory, for later use by a different preload operation.

In some embodiments, agent 50 may maintain a pool of preloaded virtual Displays 108, which are created with different properties and/or state. In such an embodiment, agent 50 performs each preload operation in the preloaded virtual Display that matches its desired target properties and state. For example, agent 50 may maintain two preloaded virtual Displays 108—one for landscape orientation and the other for portrait orientation. Apps that force a landscape orientation will be preloaded in the former, while apps which can use any orientation and are expected to be used in portrait, will be preloaded in the latter. When using a pool of preloaded virtual Displays, it may be permitted to perform several preload operations simultaneously within the same preloaded virtual Display, since these operations share the same target properties and state.

As another example, when the OS uses several viable regular Displays into which apps can be launched by the user, each with its own different properties, agent 50 may create a corresponding preloaded virtual Display that matched each of the regular Displays in each of their expected states. The latter embodiment is useful, for example, in cases where virtual Displays are limited or expensive resources, e.g., due to construction or maintenance costs.

As noted above, a preloaded virtual Display 108 is designed as a temporary placeholder for content that is later transferred to a regular Display. As such, a given preloaded virtual Display should resemble the corresponding regular Display (the target Display) as closely as possible. To that end, agent 50 typically sets a preloaded virtual Display to emulate some or all of the properties of the target regular Display, such as its height and width.

As the properties of a preloaded virtual Display are set to emulate a regular Display, agent 50 should specify which regular Display to emulate. The emulated regular Display is typically chosen to be the target Display onto which the app is expected to be transferred, as defined above. In practice, however, in many cases there is only one such target Display (e.g., default Display 104 of FIG. 3) which is associated with display screen 56 of the user device. In these embodiments, any preloaded virtual Display 108 typically emulates the properties of the default physical Display 9 and thus the properties of display screen 56.

In some embodiments, the target Display comprises certain system decorations—UI elements such as a status bar or navigational components. These decorations take up some of the display area available for apps. Preloaded virtual Displays should typically mirror these components in order to make sure that preloaded apps are rendered on an area identical to the area available in the target Display. Thus, in some embodiments agent 50 creates decorations in a preloaded virtual Display similarly to the way the decorations are created for the corresponding target Display. In some embodiments, agent 50 does not actually create the decorations within the preloaded virtual Display, but rather calculates and reserves the dimensions of the decorations, so that the area available in the preloaded virtual Display in reduced accordingly.

In some OSs and user devices, the orientation is a state variable of a Display. As such, encapsulating preload operations into preloaded Displays virtual allows the OS to preload apps using different orientations without affecting the regular Displays, and especially without changing the orientation of the Display the user is interacting with. In some embodiments, agent 50 determines the orientation of a certain preloaded virtual Display by negotiation with the app requirements, in a similar manner to a physical Display. For example, for an app that requires landscape orientation, the negotiation causes agent 50 to change the orientation of the preloaded virtual Display to landscape, while the default Display may remain in portrait. In other embodiments, the orientation is fixed per preloaded virtual Display.

For apps that can be used in one of several different orientations, agent 50 may determine a target orientation based on, for example, the orientation in which the preloaded content is expected to be used. Agent 50 may then set this orientation as the orientation of the preloaded virtual Display, possibly taking into account usage history of the app, the current state of the physical device, and/or other suitable factors.

Preloading Through Use of Intents

In some embodiments, OS 48 supports the use of "intents" and "intent resolution". The term "intent" refers to an advance indication of an operation to be performed. Among the various operations, an operation may be the starting of an Activity. The term "intent resolution" refers to a function of OS 48 that handles intents, resolves intents to the required operations, and optionally performing the required operations.

In some embodiments, preloading of Activities is performed as part of the intent resolution of OS 48. In these embodiments, an intent to open an Activity may be marked as a preload intent, in which case the operation to be performed is the preloading of the Activity, as opposed to regular, non-preload, launching of the Activity. In such embodiments, the intent resolution function of the OS may receive both regular intents and preload intents. In some embodiments, the non-preload intents may comprise intents to launch an Activity in response to the user entry to an existing Activity, which may be preloaded or not. In some embodiments, if a non-preload intent is received for an already preloaded Activity, the intent resolution function detects this fact and triggers the actions required upon Activity/app exit from preload state, e.g., as mentioned above.

In some embodiments, during intent resolution of preload intents, OS 48 resolves the target Activity to be preloaded, decides whether to preload it or not, and acts accordingly. In some embodiments, at least part of handling a preload intent is performed under a system lock, so that the decision to preload and the actual preloading are performed in an atomic manner, avoiding potential race conditions with the system state.

In some embodiments, the creation of the preload intents is performed in a previous stage, based on several inputs such as system events, e.g., an app being swiped-off from recents screen, an app being exited using the back button, reception of a push notification, etc.

In some embodiments, the decision to create a preload intent and/or to actually preload according to the intent depends on a preload policy, maintained by the OS. In some embodiments OS 48 maintains the preload policy through the use of a system app. For example, the preload policy may be created by the system app, and/or kept persistent in the data section of that system app.

In some embodiments, the preload policy is defined, at least in part, by considering configuration settings set by the user app, e.g., through a supplied API. Such configuration can be set by the app at any point, e.g., upon app initialization. In some embodiments, the preload policy is defined, at least in part, by considering further configuration settings, which are set by device-internal algorithms (e.g., by agent 50) and/or by server-side algorithms (e.g., by preload control unit 72 of FIG. 1). Such algorithms may comprise, for example, usage pattern analysis algorithms, artificial intelligence, machine learning algorithms, and the like.

Preloading in Accordance with a Preload Policy Received from Network-Side Server In some embodiments, OS 48 receives a preload policy from preload control unit 72, and preloading agent 50 carries out the various preloading operations in accordance with this policy. As noted above, the OS may manage the preload policy using a system app. OS 48 may obtain updates of the preload policy from time to time, e.g., over the air from preload control unit 72. In various embodiments, the preload policy may specify the following definitions and parameters, for example:

- A specification of which apps to preload and when.
- A specification of whether and which in-app content to preload.
- A specification of how much of an app component to preload (e.g., only executing some initial executable code, or pre-rendering of the app's user interface, and/or a maximal duration of foreground simulation).
- A specification of the use of preloading modes, e.g., off-line preloading and/or on-line preloading, e.g., as described in PCT Application PCT/IB2020/057046, cited above.
- A "whitelist" of apps—A limited list of apps. In some embodiments, OS 48 only allows preloading of apps that appear on the whitelist. In other embodiments, OS 48 allows preloading of apps that appear on the whitelist, in addition to apps which have integrated and called a specific API, e.g., a preload init API, provided apps e.g., via an SDK.
- A specification of the maximum duration of Foreground Simulation, either for all apps and/or specifically for some apps.

Additional aspects of managing preloading operations using a network-side server are addressed, for example, in U.S. Provisional Patent Application 63/118,068, cited above.

Preloading in an Expected Device Orientation

In some embodiments, when preloading an Activity, OS 48 defines a target device orientation (e.g., portrait or landscape) for the Activity preloading, which may be different from the current orientation of user device 24. The preloaded Activity is thus pre-rendered as if the user device is in the target orientation, while other device functionality continues normally with the actual orientation. This feature allows the preload to be used fully, even in face of orientation changes. For example, the user may be watching a video in landscape and is then predicted to open a social app after the video is done, in portrait. In such a case OS 48 may preload the predicted social app already in portrait. In some embodiments, the target orientation is selected by the OS based on the usage pattern of the app, the target Activity, and/or the orientations which the preloaded app supports.

In some embodiments, the OS may maintain a preloaded Activity in more than one orientation simultaneously, and display the Activity with an orientation matching the orientation of the user device at the time of user entry.

In some embodiments, if the orientation of the preloaded Activity does not match the orientation of the user device at the time of user entry, OS 48 destroys the preloaded Activity. In other embodiments, the OS re-renders the preloaded Activity at time of entry to match the current orientation.

In some embodiments, OS 48 may respond to orientation changes of the user device by potentially destroying preloaded Activities having a different orientation, or re-rendering such Activities to match the current orientation.

Preloading in Multi-Window

In some embodiments, OS 48 allows preloading of Activities during multi-window mode (also referred to as "split-screen" mode), even for Activities of apps that do not support multi-window. Conventionally, when an Activity needs to be launched (e.g., due to user entry) for an app that does not support multi-window, the OS checks whether the user device is currently in multi-window mode. If so, the OS may show an error message or exit multi-window mode. In some embodiments of the present invention, OS 48 may ignore this check when preloading Activities, and allow the Activity to launch in the background, as if in full screen, while keeping the user device in multi-window mode.

In addition, in some embodiments OS 48 fully utilizes preloaded Activities for instant display, even in multi-window, regardless of whether or not these Activities have been preloaded during multi-window. In some embodiments, this feature is implemented by holding all preloaded Tasks in at least one preloaded Task stack, and re-parenting the preloaded Task to the system's multi-window Task stack when the OS needs to display the preloaded Activity.

Content Enriching for Preloaded Activities

In some embodiments, the content fetched by the app to be rendered on a preloaded Activity may be of higher quality (e.g., images/videos of higher definition; 3D images instead of 2D images, etc.) than the normal content that would have been fetched during real-time Activity loading (i.e., when the Activity is created due to a user request and not due to preloading by the OS). In some embodiments, such enriching of content is accomplished by having the app request higher quality content upon preloading of Activities.

In an embodiment, in order to decide on content quality, the app may check whether or not its Activities are being preloaded by using an API, e.g., the isPreloaded( ) method mentioned above.

In some embodiments, content reduction algorithms which normally apply, are skipped during preload. For example, image quality reduction algorithms which are applied on the server side, e.g. by a Content Delivery Network (CDN), are skipped when the content is fetched for preload. In some embodiments, the skipping of content quality reduction on the server side is overridden due to an explicit request by the app, when the app performs fetching of the content. In some embodiments, a preloaded app may indicate to the server that it has a good-quality network connection, regardless of the actual network connection, to allow for higher quality content during preload. In some embodiments, a preloaded app may indicate to the server that it is fetching content during preload, to allow the server to decide on the desired content quality during preload.

Masking Unexpected Interactions while an Activity is Preloaded

In some embodiments, when an Activity is being preloaded and possibly also when it is in the background state due to preload, OS 48 masks (hides) unexpected interactions which can cause the user to be aware of the preloaded Activity. In some embodiments, the masking of such interactions includes masking of popup messages such as toasts (In Android) and error messages.

User Entry While an Activity is Being Preloaded

In some embodiments, if the user enters an app/Activity that is currently being preloaded, OS 48 stops the preloading and re-creates the app/Activity as if it was not being preloaded (e.g., from scratch). In alternative embodiments, the OS completes the preloading procedure, and in the meantime shows a predefined screen to the user. After the preload is completed, the OS removes the predefined screen and displays the preloaded Activity as it does on user entry to a preloaded Activity. Further alternatively, the OS may perform all actions required upon user entry to a preloaded Activity (as previously defined), making the preloaded Activity visible to the user, and the loading of the Activity continues while in foreground.

Avoid Preloading when CPU is Busy

In some embodiments, preloading is avoided when the user device CPU is too busy, e.g., according to a predefined or dynamically set condition. This feature can assist in increasing the likelihood that preload will complete in a timely manner and therefore can assist in not wasting resources such as power and data (e.g., due to auto-fail timer limitations as described earlier).

Preloading in Battery-Sensitive Situations

In some embodiments, preloading is assigned low priority by the OS, or even avoided altogether, in situations where power drain is sensitive. Such situations may comprise, for example, cases in which the user device battery is too low (e.g., the remaining energy is below a preconfigured threshold), when the user device enters a battery-saving state controlled by the OS (e.g., the Android Doze state), when the user device enters a battery-saving state controlled by the user (e.g., the Android Battery Saver state), or when the specific app enters an app-specific battery-saving state (e.g., the Android App Standby state).

In contrast, in some embodiments OS 48 triggers preload more liberally (e.g., more frequently) in situations where power concern is less severe than usual, e.g., when the user device is connected to external power supply.

Preload as an Instrument to Save Power/Battery

In some embodiments, the disclosed preloading techniques are used as a measure for saving power and/or battery resources. Such saving can be accomplished by using any of the following example schemes:

Usage of preload to save wasted screen time: In this scheme, preload is used to reduce power drained by the user device screen, while the user waits for the content to be loaded. In an example embodiment, the OS gives a suitable preference to preload depending on how much power is drained by the presented screen or content during the waiting time on normal (non-preloaded) launch.

Usage of preload to save power drained due to bad network conditions: In this scheme, preload is used to reduce power drained by the device networking hardware, such as cellular modem. In some embodiments, the OS gives preference to preload in cases where the expected power drain during preload due to networking is less than a certain threshold. For example, preload may be preferred in situations of good 4G or 5G coverage and/or when connected to Wi-Fi. In some embodiments, preload is preferred in cases where the preload policy estimates a high enough likelihood that the user will use the preloaded app in network conditions, which are poorer than the existing network conditions by a given threshold. For example, the OS may decide to preload an app in case the preload policy estimates a high enough likelihood that it will be used in a situation of 3G coverage, while the current situation is of good Wi-Fi.

Usage of preload to save power drained due to seriality of app usage: In this scheme, the OS performs preload concurrently (e.g., preloading of multiple apps/Activities at the same time) to reduce wasting of power due to the normal running of apps in a serial manner. Such bundling of preload operations increases the power efficiency of device hardware such the cellular modem, Wi-Fi communication hardware, CPU and GPU.

Usage of preload to save power drain due to app usage while device is not connected to an external power supply: In this scheme OS 48 gives preference to preload while the user device is connected to an external power supply and/or when the preload policy estimates a high enough likelihood that the app will be used while the device is not connected to an external power supply.

Preload as an Instrument to Allow Improved Offline Experience

In some embodiments, the disclosed preloading techniques are used to provide the user an improved offline experience. The term "offline experience" refers to the case where a user enters or attempts to use an app while the user device is offline (i.e., cannot connect to the appropriate portal 28 via the network, e.g., due to disconnection from the Internet). Improved offline experience may refer, for example, to the following advantages that may be provided during offline experience:

Allowing an app to display content, instead of not showing any display.

Allowing an app to display newer content than it would have shown without preloading.

Allowing an app to display content that is new to the user, i.e., content that the user has not consumed before.

In some embodiments, OS 48 gives preference to preload in cases where the preload policy estimates a high enough likelihood that the user will use the preloaded app while the user device is offline.

Preload as an Instrument to Save Cellular Data

In some embodiments, the disclosed preloading techniques are used as a measure for saving cellular data consumption. Such saving can be accomplished, for example, by preferring preload while the user device is connected to Wi-Fi. In some embodiments, preload is done mostly or exclusively when connected to Wi-Fi, and may be inhibited otherwise. In some embodiments preload is preferred while the device is connected to Wi-Fi, in cases where the preload policy estimates a high enough likelihood that the user will use the preloaded app while not connected to Wi-Fi.

Preload in Cellular Data Sensitive Situations

In some embodiments, OS 48 gives a low preference to preload, up to the point of being avoided, in situations where cellular data consumption is extra sensitive. Such situations may comprise, for example, scenarios in which the user device is roaming, scenarios in which the user device enters a cellular-data-saving state controlled by the OS (e.g., the Android Doze state), scenarios in which the user device enters a cellular-data-saving state controlled by the user (e.g., the Android's Data Saver state), or scenarios in which the specific app enters an app-specific cellular-data-saving state (e.g., the Android App Standby state).

Defining a Cellular Data Budget for Preload

In some embodiments, OS 48 measures the cellular data consumed by preloading operations. In some embodiments, the measured cellular data consumed by preload comprises the data consumed by the app during the time it has Activities in the simulated foreground state. In other embodiments the measured data comprises the data consumed by the app during the time it has any Activity preloaded (either in the simulated foreground state or in the background). In yet other embodiments the measured data comprises the data consumed by the app during the time it has specific Activities preloaded (either in the simulated foreground state or in the background). Further alternatively, the measured data comprises the data consumed by the app during the time it has its designated "main Activity" (entry-point Activity as defined above) preloaded (either in the simulated foreground state or in the background. In some embodiments, the OS counts separately Activities preloaded as part of AppPreload (app preloading) and Activities preloaded as part of InAppPreload (preloading of in-app Activities).

In some embodiments, the OS maintains data consumption budgets for the preloaded data. In some embodiments, the OS sets an overall data consumption budget for all apps together. In other embodiments the OS sets a separate data consumption budget per app. In some embodiments, the OS maintains separate data consumption budgets per given time duration, e.g., a daily budget, weekly budget, monthly budget and so on. In some embodiments, the time duration is determined based on the user's usage pattern.

In some embodiments, the OS sets the data consumption budget to a predefined fixed parameter (e.g., 10 MB). In some embodiments, the OS sets the data consumption budget to a dynamic parameter. In some embodiments, the dynamic parameter is set based on learning of the app/device usage pattern. In some embodiments the budget of a given app for a given time period is set as a function (e.g., a linear function) of the estimated user's usage of that app in the given time period.

In some embodiments, upon reaching a certain data consumption budget, the OS will refrain from triggering further preloads which affect that certain preload budget. For example, in case the data consumption budget of a given app for a given period and a given functionality set (AppPreload/InAppPreload) is exhausted, the OS does not trigger further preload for the given functionality set during the remaining time of that given period. In some embodiments, the OS keeps track of the data consumption budgets that have been consumed, and adapts the preload policy to reduce the chance of consuming that preload budget at the next given period.

In some embodiments, the preload data consumption budget is defined as part of a wider data consumption budget, such as a data consumption budget for background state, whether per app or for the user device as a whole.

In some embodiments, when deciding whether to preload or not, the OS considers the resources required by an app to preload. Such resources may comprise, for example, power drain, cellular data, memory, CPU, GPU and the like. In some embodiments, the OS learns this information over time, by measuring the resources consumed during preload. In some embodiments, the app at least partially declares (e.g., through an API) its requirements for at least part of such user device resources.

User Opt-Out/Opt-In

In some embodiments, OS 48 provides the user a UI option to opt-out of preload, and/or to opt-in to preload. In some embodiments the opting-in/out relates only to AppPreload functionality (i.e., the OS will not trigger app preloading for a user who has opted-out of AppPreload, and vice versa). In some embodiments the opting-in/out relates only to InAppPreload (i.e., to preloading of in-app Activities). In some embodiments the opting-in/out relates both to AppPreload and InAppPreload functionality.

In some embodiments the opting-in/out is given as an option in a certain settings menu. The option may be explicit, e.g., the user can explicitly choose whether or not the OS should trigger the relevant preload functionality set. In other embodiments the opting-in/out is implicit, e.g., using a UI option that does not directly relate to preload. For example, forced stopping of an app (e.g., through the settings menu in Android, or by swiping-off an app from recents menu in iOS) will cause an implicit opt-out of preload, at least until the app is not in forced-stop state. As another example, setting the user device to a battery-saving state by the user (e.g., the Android Battery Saver state) will cause an implicit opt-out of preload, at least until the user device has exited from the battery-saving state.

App Opt-Out/Opt-In

In some embodiments, OS 48 provides the app an option, e.g., through an API, to opt-out of and/or opt-in to preload.

In some embodiments the OS provides one API for opting-out and opting-in, both for AppPreload and InAppPreload. In other embodiments the OS supplies an API that allows the app to select which functionality to opt-out/opt-in of, either AppPreload, InAppPreload or both. When an app opt-outs of a preload functionality, the OS does not trigger that functionality until the app opts-in again.

User-Initiated Preload Triggering

In the embodiments described up to this point, preloading operations were typically triggered by OS 48, in response to various possible conditions and criteria. In alternative embodiments, OS 48 enables the user to request preloading explicitly. In some embodiments, OS 48 provides a UI that comprises an option for the user to explicitly request preloading of a specific app or a set of apps. Preloading agent 50 preloads an app or a set of apps in response to an explicit request from the user, provided using this UI option.

In an embodiment, OS 48 presents the UI option to the user only for apps which support app preloading. In some embodiments, the option is given as part of the UI of the user device home screen (also known as "Launcher" in Android OS). In some embodiments, the UI option lets the user access extra launching options for a certain app by a certain UI method of the home screen, e.g., by pressing and holding an icon of the selected app, whereas the extra launching options comprise an explicit option for preloading the selected app.

When preloading explicitly due to a request by the user, agent 50 preloads the app in the background, e.g., using any of the preloading techniques described herein or using any other suitable preloading technique.

In some embodiments, preloading is completely transparent to the user. In other embodiments, although the app is preloaded in the background (without being displayed to the user), the preloading operation is permitted have some effect on the user experience, e.g., due to usage of user device resources such as the CPU and audio. In some embodiments, OS 48 does not play the audio of preloaded apps, to prevent interference for the user. These kinds of partial transparency or non-transparency may be acceptable by users as the app is being preloaded due to their explicit request.

In some embodiments, the app supports both preload which is explicitly requested by the user and preload which occurs not due to the user's request (e.g., triggered by the OS). In some embodiments, the app utilizes the same logic for both kinds of preload. In other embodiments the app uses different logic for user-initiated preload and for non-user-initiated (e.g., OS-initiated) preload.

In some embodiments, the app is not aware of preload that is explicitly requested by the user. This means the app runs the same logic when preloaded and when normally launched. Specifically, in these embodiments the app does not need to integrate specific APIs to support preloading. This functionality may be acceptable in case of a preload which is explicitly requested by the user, as opposed to preload which occurs not due to user's request, e.g., preload that the user is unaware of For example, certain app actions, such as analytics which report that the user had launched the app, may be reasonable to be performed in case of a preload which is explicitly requested by the user, as opposed to the case of a preload which happens not due to user's request, where such actions may not be applicable.

Reporting Preload Status to User

In some embodiments, OS 48 presents to the user information that is indicative of the current progress status of preloading. Any suitable output can be used for this purpose. For example, OS 48 may present to the user a progress bar that gradually fills as preloading progresses. Such a progress bar may be displayed, for example, as part of the app's icon or elsewhere in the UI.

As another example, after preload of an app is completed, OS 48 indicates to the user that the app is ready to be used. This indication is referred to herein as "preloading completion." The OS may provide a preloading completion indication only for apps whose preloading was triggered by the user, only for apps whose preloading was triggered by the OS without explicit request of the user, or for both. In some embodiments, the preloading completion indication for apps whose preloading was triggered by the OS (without explicit request of the user) is different from the preloading completion indication provided for preloading of apps whose preloading was triggered explicitly by the user.

In some embodiments, the OS provides the preloading completion indication through a UI notification, e.g., in a window of the OS UI that normally displays notifications to the user. In some embodiments, the preloading completion indication is provided by suitably marking the app's icon on the launcher.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   in a user device, deciding to preload at least a User-Interface (UI) display of a user application; and
   preloading at least the UI display in a simulated-foreground mode in which (i) the UI display of the preloaded user application is processed in a foreground mode from the perspective of the preloaded user application, but (ii) the same UI display of the same preloaded user application is kept in a background mode from the perspective of a user of the user device and hidden from the user.

2. The method according to claim 1,
   and comprising maintaining (i) one or more first data structures for storing non-preloaded UI displays and (ii) one or more second data structures for storing preloaded UI displays,
   wherein preloading the UI display comprises initially assigning the UI display to one of the second data structures, and subsequently, in response to meeting a criterion, reassigning the UI display to one of the first data structures.

3. The method according to claim 2, wherein reassigning the UI display to one of the first data structures is performed upon deciding that preloading of the UI display is completed successfully, or upon user interaction with the preloaded user application.

4. The method according to claim 2, wherein the one or more first data structures comprise one or more first stacks of non-preloaded UI displays, and wherein the one or more second data structures comprise one or more second stacks of preloaded UI displays.

5. The method according to claim 2, wherein the one or more first data structures comprise a target display associated with non-preloaded UI displays, and wherein the one or more second data structures comprise one or more virtual displays associated with preloaded UI displays.

6. The method according to claim 1, wherein preloading the UI display comprises applying lifecycle events of an operating system of the user device that are specified for foreground processing of activities.

7. The method according to claim 1, and comprising deciding that preloading of the UI display is completed successfully in accordance with a completion criterion, and in response transitioning the UI display to a preloaded-background state in which both the preloaded user application and the user consider the UI display to be in the background.

8. The method according to claim 1, and comprising discarding the preloaded UI display in response to detecting an error occurring in the simulated-foreground mode.

9. The method according to claim 1, wherein preloading at least the UI display comprises preventing the preloading from affecting one or more of:
   a recents list of the user device;
   usage metrics of the user device; and
   decisions relating to entry to a power-saving state.

10. The method according to claim 1, wherein preloading at least the UI display comprises preloading at least part of the preloaded user application starting from an entry-point UI display of the preloaded user application.

11. The method according to claim 10, wherein preloading the user application excludes preloading of one or more of:
    content that changes by more than a predefined rate; and
    content whose preloading required fetching over a network.

12. The method according to claim 1, wherein preloading at least the UI display comprises preloading one or more in-app UI displays, which are associated with the preloaded user application but are not immediately displayed upon launch of the preloaded user application.

13. The method according to claim 1, wherein preloading at least the UI display comprises preloading the UI display with a target orientation that differs from a current display orientation of the user device.

14. The method according to claim 13, wherein the target orientation is an orientation with which the user is predicted to access the preloaded user application.

15. The method according to claim 1, wherein preloading at least the UI display comprises fetching content of the UI display over a network, with a quality that is higher than the quality used for real-time fetching of the content.

16. The method according to claim 1, and comprising presenting to the user information indicative of a progress of preloading the at least UI display.

17. A user device, comprising:
    a display screen, configured to display User-Interface (UI) displays of user applications to a user; and
    a processor, configured to:
        decide to preload at least a UI display of a user application; and
        preload at least the UI display in a simulated-foreground mode in which (i) the UI display of the preloaded user application is processed in a foreground mode from the perspective of the preloaded user application, but (ii) the same UI display of the same preloaded user application is kept in a background mode from the perspective of a user of the user device and hidden from the user.

18. The user device according to claim 17, wherein the processor is configured to:
maintain (i) one or more first data structures for storing non-preloaded UI displays and (ii) one or more second data structures for storing preloaded UI displays,
initially assign the UI display to one of the second data structures, and subsequently, in response to meeting a criterion, reassign the UI display to one of the first data structures.

19. The user device according to claim 18, wherein the processor is configured to reassign the UI display to one of the first data structures upon deciding that preloading of the UI display is completed successfully, or upon user interaction with the preloaded user application.

20. The user device according to claim 18, wherein the one or more first data structures comprise one or more first stacks of non-preloaded UI displays, and wherein the one or more second data structures comprise one or more second stacks of preloaded UI displays.

21. The user device according to claim 18, wherein the one or more first data structures comprise a target display associated with non-preloaded UI displays, and wherein the one or more second data structures comprise one or more virtual displays associated with preloaded UI displays.

22. The user device according to claim 17, wherein the processor is configured to preload the UI display by applying lifecycle events of an operating system of the user device that are specified for foreground processing of activities.

23. The user device according to claim 17, wherein the processor is configured to decide that preloading of the UI display is completed successfully in accordance with a completion criterion, and in response to transition the UI display to a preloaded-background state in which both the preloaded user application and the user consider the UI display to be in the background.

24. The user device according to claim 17, wherein the processor is configured to discard the preloaded UI display in response to detecting an error occurring in the simulated-foreground mode.

25. The user device according to claim 17, wherein the processor is configured to prevent preloading of the UI display from affecting one or more of:
a recents list of the user device;
usage metrics of the user device; and
decisions relating to entry to a power-saving state.

26. The user device according to claim 17, wherein the processor is configured to preload at least part of the preloaded user application starting from an entry-point UI display of the preloaded user application.

27. The user device according to claim 26, wherein, in preloading the user application, the processor is configured to exclude preloading of one or more of:
content that changes by more than a predefined rate; and
content whose preloading required fetching over a network.

28. The user device according to claim 17, wherein the processor is configured to preload one or more in-app UI displays, which are associated with the preloaded user application but are not immediately displayed upon launch of the preloaded user application.

29. The user device according to claim 17, wherein the processor is configured to preload the UI display with a target orientation that differs from a current display orientation of the user device.

30. The user device according to claim 29, wherein the target orientation is an orientation with which the user is predicted to access the preloaded user application.

31. The user device according to claim 17, wherein the processor is configured to fetch content of the UI display over a network, with a quality that is higher than the quality used for real-time fetching of the content.

32. The user device according to claim 17, wherein the processor is configured to present to the user information indicative of a progress of preloading the at least UI display.

* * * * *